(12) United States Patent
Jiang et al.

(10) Patent No.: US 9,021,249 B2
(45) Date of Patent: Apr. 28, 2015

(54) UPLOAD SECURITY SCHEME

(75) Inventors: Zhaowei Charlie Jiang, San Jose, CA (US); Christopher Wu, Atherton, CA (US); Joy Sato, San Jose, CA (US); Yingqing Lawrence Cui, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 248 days.

(21) Appl. No.: 12/878,312

(22) Filed: Sep. 9, 2010

(65) Prior Publication Data

US 2011/0061099 A1 Mar. 10, 2011

Related U.S. Application Data

(63) Continuation of application No. 10/934,645, filed on Sep. 2, 2004, now Pat. No. 7,797,529.

(60) Provisional application No. 60/518,898, filed on Nov. 10, 2003, provisional application No. 60/518,858, filed on Nov. 10, 2003, provisional application No. 60/518,857, filed on Nov. 10, 2003, provisional application No. 60/518,897, filed on Nov. 10, 2003.

(51) Int. Cl.
| | | |
|---|---|---|
| G06F 9/00 | (2006.01) | |
| H04M 1/68 | (2006.01) | |
| H04W 12/08 | (2009.01) | |
| H04L 29/06 | (2006.01) | |
| H04L 12/58 | (2006.01) | |
| H04L 29/08 | (2006.01) | |

(52) U.S. Cl.
CPC ............... H04W 12/08 (2013.01); H04L 12/58 (2013.01); H04L 63/101 (2013.01); H04L 67/06 (2013.01)

(58) Field of Classification Search
USPC .......................... 709/206, 223, 224, 225, 227; 455/456.01, 404.02, 419, 412, 556.2, 455/415, 466; 348/207.01; 707/999.009, 707/781; 370/151, 201, 171, 168, 490; 726/12, 11
See application file for complete search history.

(56) References Cited

U.S. PATENT DOCUMENTS

| | | | |
|---|---|---|---|
| 6,671,735 B1 * | 12/2003 | Bender ........................ 709/238 |
| 6,741,855 B1 * | 5/2004 | Martin et al. ................ 455/419 |
| 7,188,164 B1 * | 3/2007 | Etheridge .................... 709/221 |
| 7,672,998 B1 * | 3/2010 | Haskins et al. .............. 709/206 |
| 7,797,529 B2 * | 9/2010 | Jiang et al. .................... 713/151 |
| 2002/0198991 A1 * | 12/2002 | Gopalakrishnan et al. ... 709/225 |
| 2003/0035409 A1 * | 2/2003 | Wang et al. .................. 370/349 |
| 2003/0120916 A1 * | 6/2003 | Hasegawa et al. ........... 713/161 |
| 2003/0131063 A1 * | 7/2003 | Breck .......................... 709/206 |
| 2003/0179406 A1 | 9/2003 | Seto |
| 2003/0193967 A1 * | 10/2003 | Fenton et al. ................ 370/490 |
| 2005/0021983 A1 * | 1/2005 | Arnouse ...................... 713/186 |

* cited by examiner

*Primary Examiner* — Hung T Vy
(74) *Attorney, Agent, or Firm* — James J. DeCarlo; Greenberg Traurig, LLP

(57) ABSTRACT

The need for upload security arises during content sharing between users in communication link with each other and a server. In one embodiment, providing the upload security involves the server identifying a mobile device that sends an upload message destined to a user. Providing the upload security further involves the server accessing opt-in parameters predetermined by the user, determining if the identity of the sending mobile device is included in the opt-in parameters, and, if so, allowing the upload to the user's account, otherwise blocking the upload. The opt-in parameters include the identity of mobile devices that are authorized by the user to upload data to the user's account. In one embodiment, the communication link includes a wireless carrier network with capability for security screening of the upload message before it reaches the server based on the identity of the wireless carrier network.

16 Claims, 23 Drawing Sheets

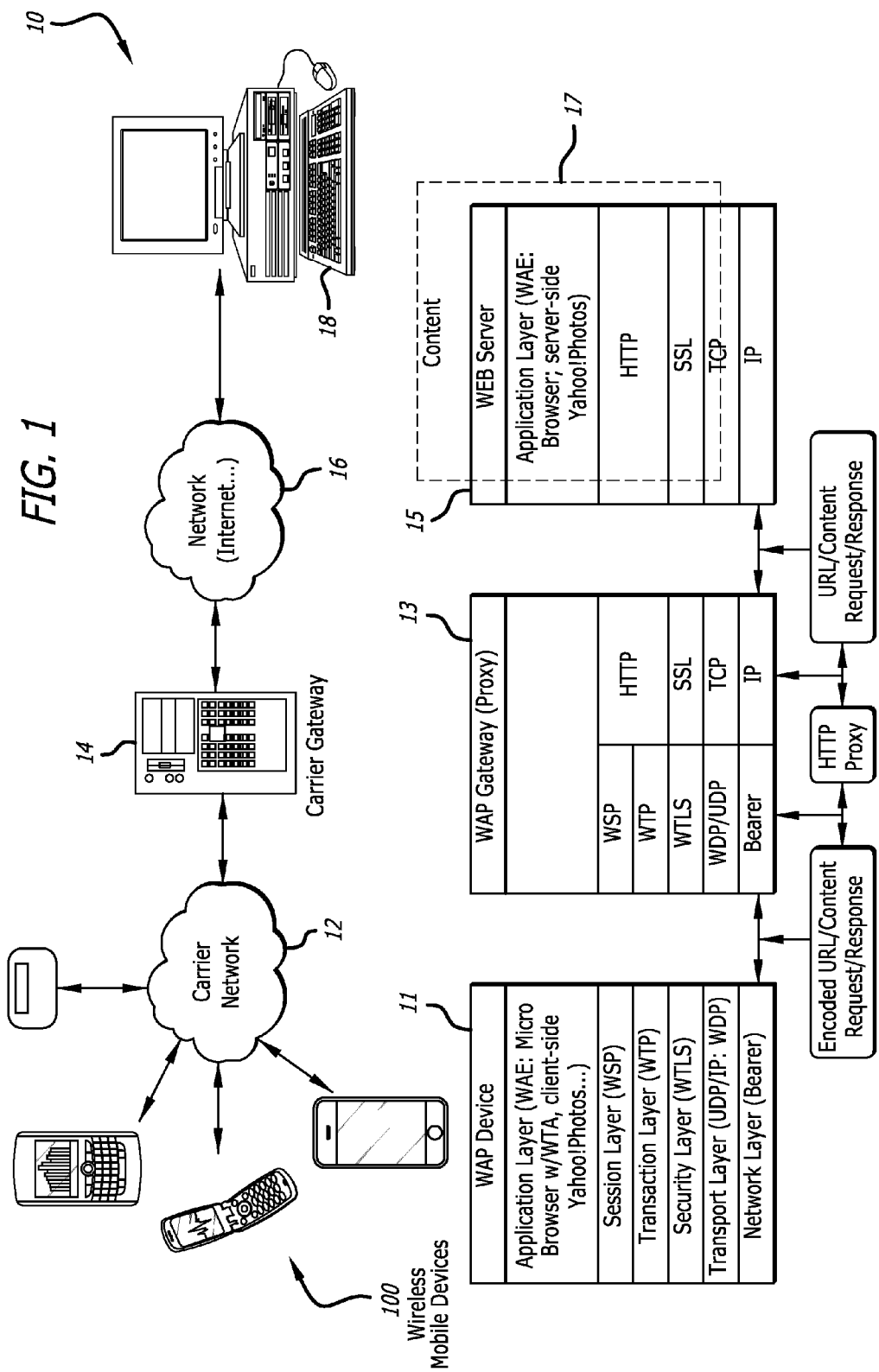

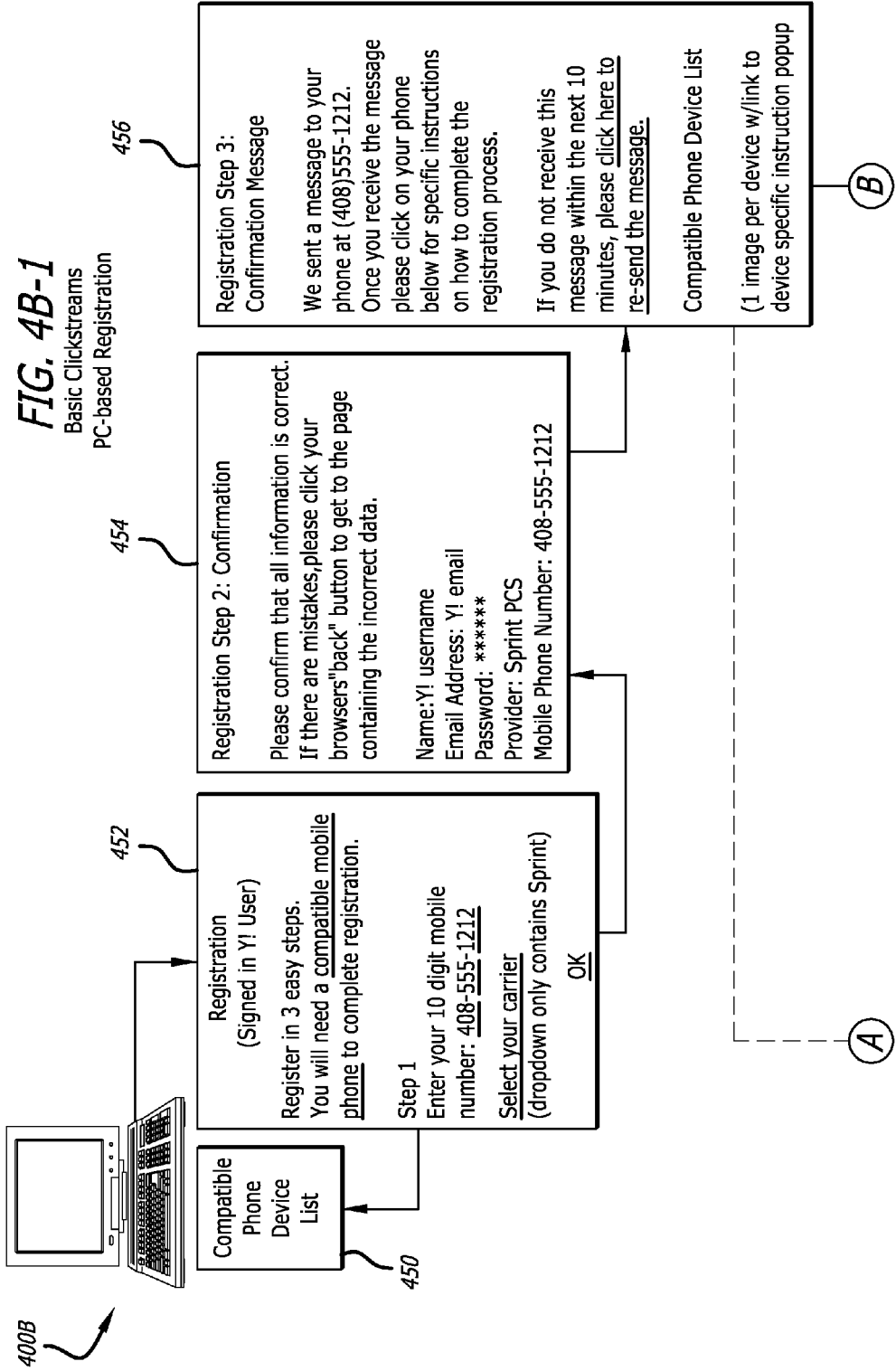

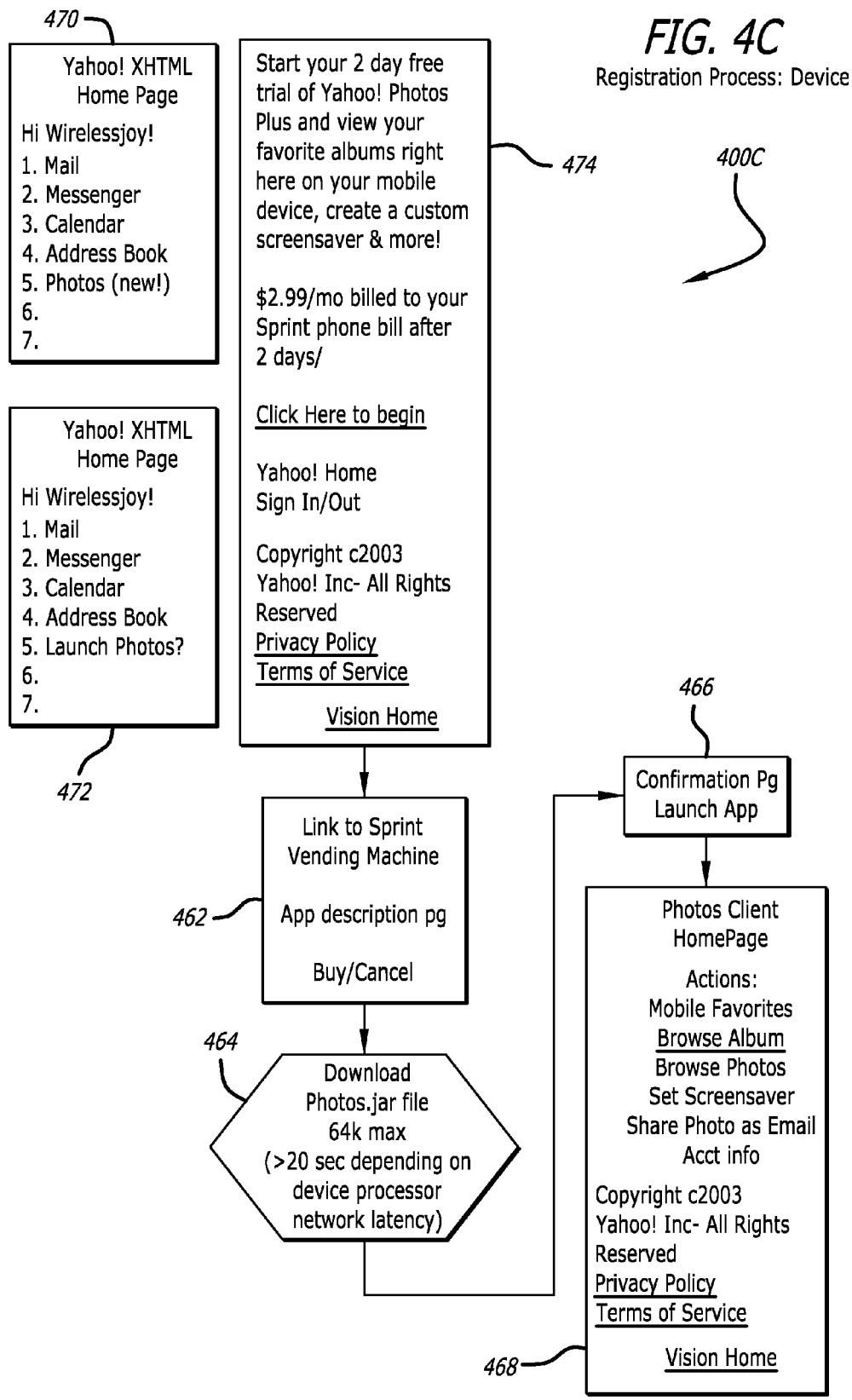

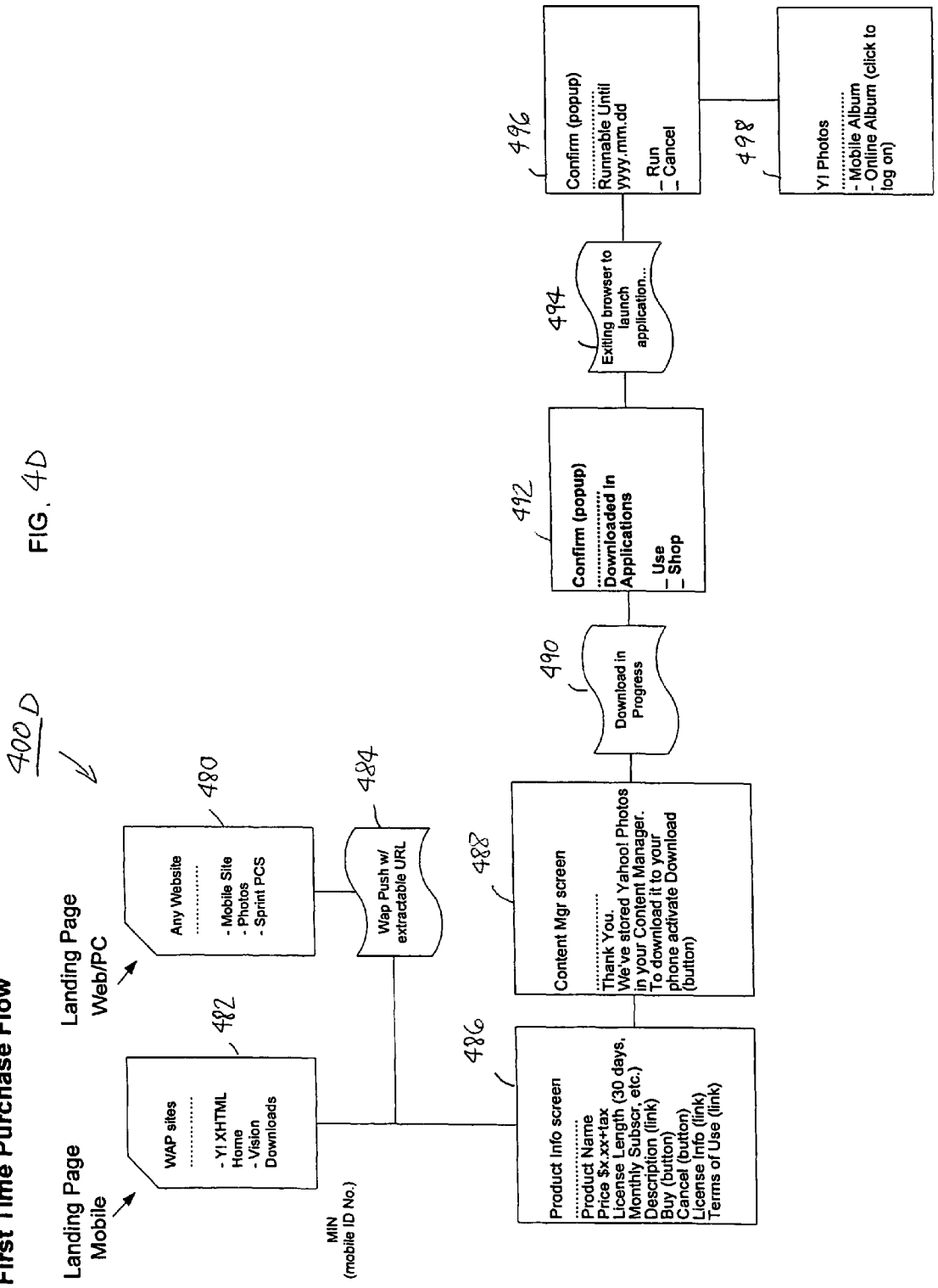

Upload Opt In Process

Screen Flows
2.0 Online Albums; 3.0 Mobile Albums

FIG. 6B-3

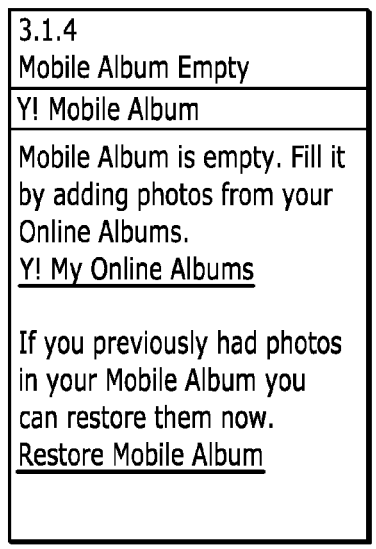

3.1.4
Mobile Album Empty

Y! Mobile Album

Mobile Album is empty. Fill it by adding photos from your Online Albums.
Y! My Online Albums If you previously had photos in your Mobile Album you can restore them now.
Restore Mobile Album

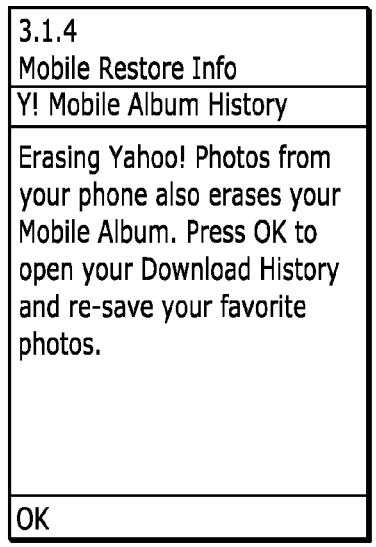

3.1.4
Mobile Restore Info

Y! Mobile Album History

Erasing Yahoo! Photos from your phone also erases your Mobile Album. Press OK to open your Download History and re-save your favorite photos.

OK

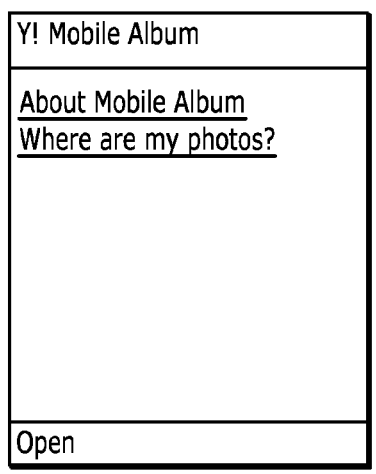

Y! Mobile Album

About Mobile Album
Where are my photos?

Open

Fig. 6C

Client: Mobile Favorites
YAHOO! PHOTOS

(i)

3.3.1
Mobile Favorites HP
(Default album cover)
[Tibetan Monk]
1 of 15 photos
Actions:
Begin Slideshow
Open Album
Organize
(Next/Previous Photo)
Thumbnails
Txt View
Set Screensaver
Share Photo as Email
Photos Home 3.3.2
Mobile Favorites
Txt View
(Alphabetic or upload order list)
1. Tibetan Monk
2. Venice
3. Thailand
4. San Sebastian
(max=30 per screen?)
Actions:
View Photo
Next (list pg 2)
Thumbnail views
Begin Slideshow
All Albums
Set Screensaver
Share Photo as Email
Save to Mobile Favorites
Photos Home 3.3.3
Mobile Favorites
Thumbnail View
(default 6 per screen)
1. Tibetan Monk
2. Venice
3. Thailand
4. San Sebastian
5. Athens
6. Istanbul
Actions:
Scroll
View Photo
Next (list pg 2)
Thumbnail toggle (4 or 6)
Txt views
Begin Slideshow
All albums
Set Screensaver
Share Photo as Email
Save to Mobile Favorites
Photos Home 3.3.1"
Mobile Favorites
Slideshow
[1st Image]
filename
1 of 15
Actions:
Start/Stop
Full Screen
Set Speed Slow/Fast
Next/Previous
Organize
Thumbnails
Txt View
Set Screensaver
Share Photo as Email
Photos Home Mobile Favorites
Slideshow
Full Screen
[Image]
Action:
Show Menu —Show Menu—

(ii)

4.0  Phase 1: PC only
Organize Favorites
(txt list)
1. Tibetan Monk
2. Venice
3. Thailand
4. San Sebastian
5. Athens
6. Istanbul
Actions:
Add photo
Re-order photos
Delete photos
Refresh (up to 30 sec)
Favorites Home
Album List Home
Photos Home 4.2
All non single photo entry points
Album HP
Album Txt &
Thumbnail Views
Add to Favorites 4.3
All single photo entry points
[photo]
Add to Favorites 4.2.1
Step 1
Select Album
1. Album A
2. Album B
3. Album C
4. Album D 4.2.2
Step 2
Select Photo
1. Photo A
2. Photo B
3. Photo C
4. Photo D 4.4
Slot open?
Yes/No 4.4.1
Add to Fav
Success
(popup)
photoname.jpg
has been added to
your mobile fav
album 4.4.2
Add to Fav Fail
(popup)
All ready have 15
photos, delete 1
first.
Go To Organize
Fav or Cancel 4.1
Refresh Local
Cache/
Update
Server Side
Mgmt Info Add Photo → / Server Call —Delete photo to save new one—

Restoring the Mobile Album

"Back Button" Flow

Upload Security

Upload Security

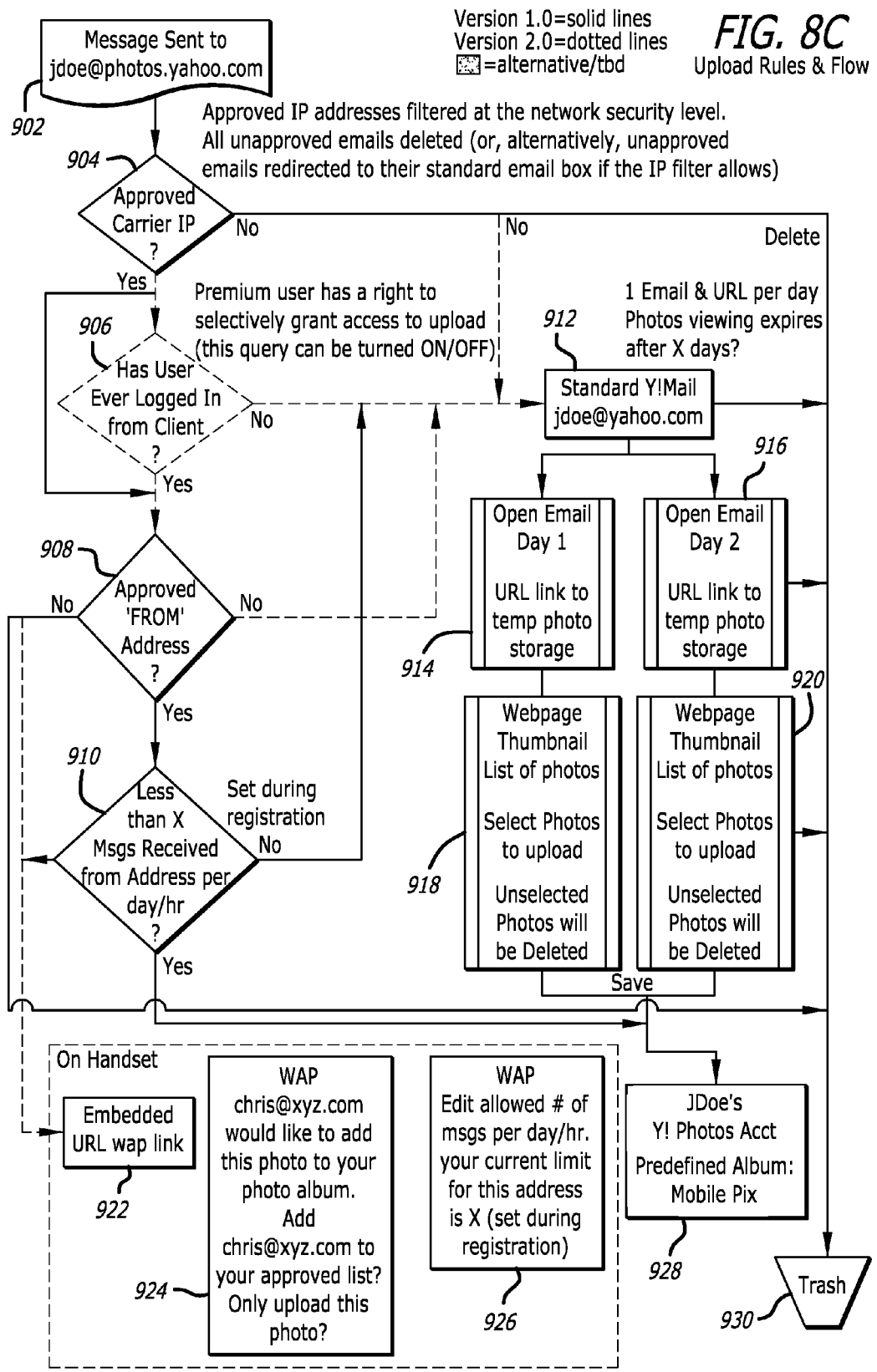

UPLOAD SECURITY SCHEME

REFERENCE TO PRIOR APPLICATIONS

This application is a continuation of U.S. Non-Provisional application Ser. No. 10/934,645 filed on Sep. 2, 2004 now U.S. Pat. No. 7,797,529 and entitled "UPLOAD SECURITY SCHEME," which claims the benefit of U.S. Provisional Application No. 60/518,898 filed Nov. 10, 2003 and entitled "BACK BUTTON IN MOBILE APPLICATION," U.S. Provisional Application No. 60/518,858 filed Nov. 10, 2003 and entitled "NAVIGATION PATTERN ON A DIRECTORY TREE," U.S. Provisional Application No. 60/518,857 filed Nov. 10, 2003 and entitled "BACKUP AND RESTORE IN MOBILE APPLICATIONS," and U.S. Provisional Application No. 60/518,897 filed Nov. 10, 2003 and entitled "UPLOAD SECURITY SCHEME;" each of the non-provisional and provisional applications being incorporated herein by reference.

FIELD OF THE INVENTION

The present invention relates generally to wireless mobile devices and more particularly to applications that offer upload security. Among such applications, one type is a mobile photos application.

BACKGROUND

Mobile-friendly technologies are advanced to provide a rich multimedia environment and enhance the wireless device users' experience. An outcome of this evolution is the manifest closeness between the wireless universe and the Internet domain, as well as the advent of wireless devices with multimedia capabilities. The newest versions of mobile wireless devices such as digital mobile phones, pagers, personal digital assistants (PDAs), handsets, and any other wireless terminals, have multimedia capabilities including the ability to retrieve e-mail, and push and pull information via the Internet.

One practice these capabilities allow is sharing content, such as photos. At the same time, there needs to be a way for managing this activity. One reason for controlling content sharing is security. Typically, the need for security arises from the risk of unauthorized access to data. In the case of content sharing, the need for security arises from the additional risk of unauthorized imposition, where a sender (mobile user) uploads unwanted or excess content for a recipient without first obtaining the recipient's permission. Accordingly, the present invention provides possible ways for addressing the risks associated with unauthorized imposition.

SUMMARY

The present invention is based, in part, on the observation that a need exists for upload security, and that it can be improved as described below. Accordingly, the upload security concept is implemented so as to allow content sharing without the imposition of unwanted or too frequent uploads.

For the purpose of this invention, as embodied and broadly described herein, a method, a computer readable medium and a system are proposed as possible implementations of the upload security concept. These implementations typically involve a server in communication link with a plurality of mobile devices. In the examples below the mobile devices are typically wireless devices such as wireless camera phones and the content is photograph data (or simply one or more photos).

In one embodiment, a method for providing upload security, includes identifying the mobile device used by a sender of an upload message destined to a user, in response to the server receiving the upload message from the mobile device via a network. The method also includes accessing, in the server, opt-in parameters predetermined by the user, determining if the identity of the mobile device used by the sender is included in the opt-in parameters, and if so, allowing upload of content from the upload message to the account associated with the user. Otherwise the upload is blocked. The opt-in parameters include the identity of mobile devices that are authorized by the user to upload data to an account on the server associated with the user. In addition, optionally, the opt-in parameters include a limit number of upload messages which are authorized by the user during a given period, and wherein the method further comprises determining if the limit number for the sender is exceeded by the upload message such that it is not permitted by the user and thus the upload is blocked. If the upload is blocked, the method optionally includes rerouting the upload message to a standard email address of the user.

In this embodiment, the network includes a wireless carrier network and a networking service which provides security screening of the upload message before it reaches the server based on the identity of the wireless carrier network. The identity of the wireless carrier network includes an internet protocol (IP) address. The identity of the wireless phone is a phone number assigned to it by the bearer of the wireless carrier network. In this instance, the IP address is combined with the identity of the mobile device in the upload message, such that the method further includes parsing the upload message to obtain the IP address and the identity of the mobile device.

Further in this method, the sender uses email as a transport mechanism for the upload message. The sender identifies to the server the user for whom the upload message is destined by indicating the user's email address. Then, the server correlates the user's email address with the account associated with the user. If the capability exists, the method further includes establishing a communication link from the sender's mobile device to the user in order to prompt the user to indicate, on the user's mobile device or personal computer, whether the user wants to add the sender's mobile device identity to the opt-in parameters (in order to allow the upload).

The approach described above can be implemented in a computer readable medium embodying a computer program with program code for providing the upload security. In this implementation, the computer program is divided into parts, one part being at a server side, a second part being at a client side and a third part being at a networking service. A system for providing the upload security includes the server, plurality of the mobile devices and typically also a wireless network, the Internet and a gateway through which the server communicates with the mobile devices. The server is configured with a processor and a memory embodying a server-side program as a portion of a computer application. The server-side program includes program code for causing the processor in the server to perform the aforementioned identifying, accessing, determining and authorizing steps, in response to the server receiving from such mobile the upload message.

As can be understood from these examples, by introducing the upload security capability to the system, the present invention makes the content sharing more useful, secure and user friendly. Such advantages will be appreciated by those of ordinary skill in the art from the description and practice of the invention disclosed herein.

BRIEF DESCRIPTION OF THE DRAWINGS

The accompanying drawings, which are incorporated in and constitute a part of this specification, illustrate embodiments of the invention and together with the description serve to explain the principles of the invention. Wherever convenient, same or similar numbers or designations are used throughout the drawings to refer to the same or like elements.

FIGS. 4A-4D show the respective PC-based and mobile device-based registration and application buy flow diagrams.

FIG. 6C, parts (i) and (ii), describes setting up favorites for the mobile album slideshow.

FIGS. 8A-C illustrate details of the upload security scheme. The diagram in FIG. 8A shows the various system components' position in the upload security scheme, and the flow diagram in FIGS. 8B-C illustrate various aspects of the process.

DETAILED DESCRIPTION OF THE INVENTION

Figure 1A:
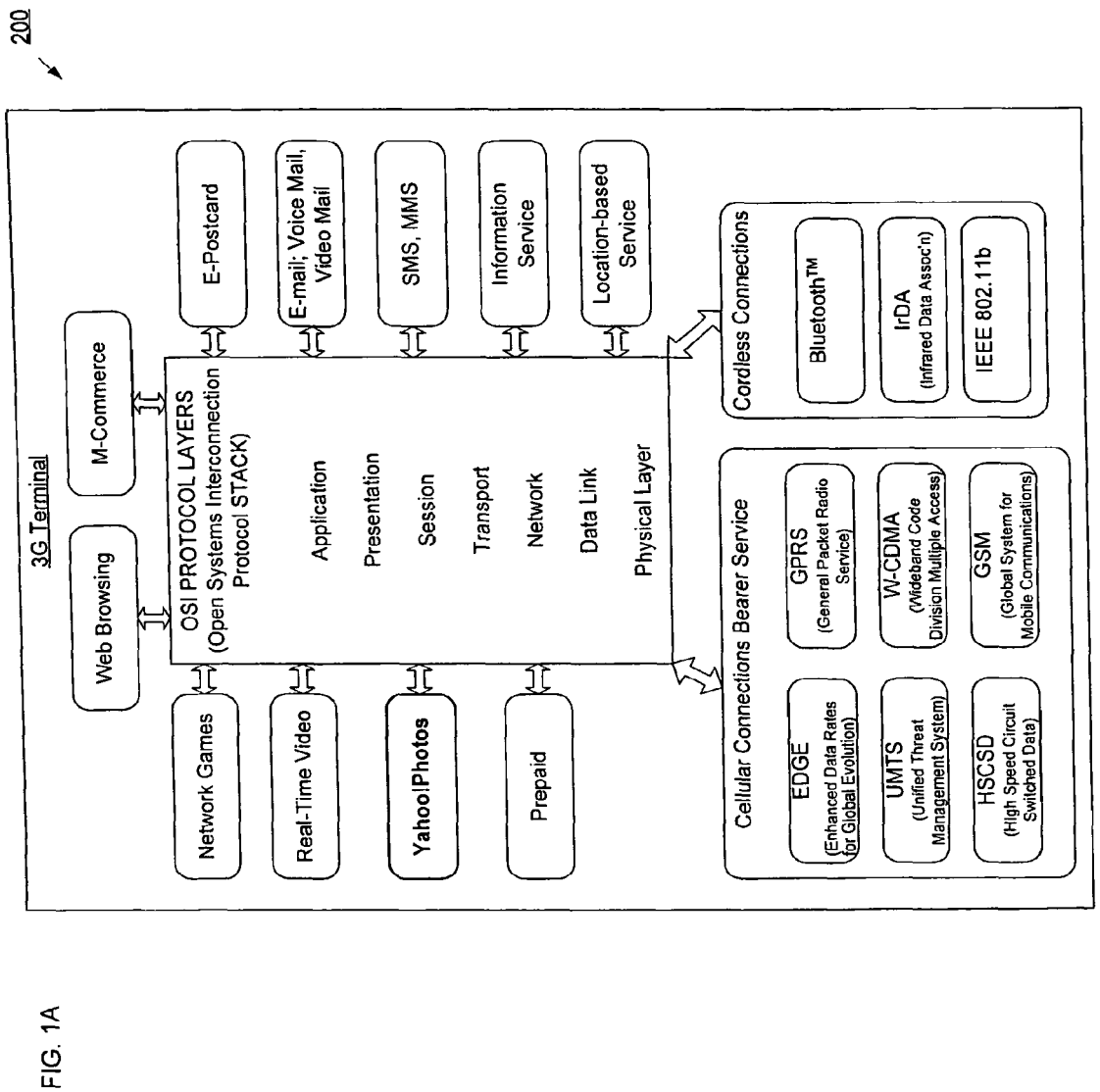
FIG. 1A shows another model of interaction, via bearer networks, between $3^{rd}$-generation (3G)-enabled mobile devices and servers as well as other devices.

The present invention contemplates upload security and implementation of this concept in mobile applications. One such application is mobile photos, an example of which is referred to as the Yahoo! Photos™ application. Yahoo! and Yahoo! Photos are trademarks of Yahoo! Inc., Sunnyvale, Calif. Any other trademarks are the property of their respective holders.

Although it can be implemented in various applications, for clarity and for illustration, the approach contemplated by the present invention is described here in the context of the Yahoo! Photos application. The server side of this application is the "server Yahoo! Photos," and the client side of this application is the mobile client application, or "client Yahoo! Photos." A client application is generally considered to be a downloadable application; namely, J2ME™ (Java™ 2 platform, Micro Edition, by Sun Microsystems, Inc.), Yahoo! Photos™, or any other application that is downloadable to the mobile device. In the example here, the client Yahoo! Photos runs on a mobile phone, and more specifically, a mobile camera phone.

The Wireless Communication Environment

A. Wireless Communication Protocols

Wireless protocols, the standards which govern communications of data between wireless devices and the Internet, utilize and support the enhanced capabilities of modern mobile wireless devices and Internet content technologies. Hypertext transfer protocol (HTTP) is an often used standard, and other standards include the Wireless Application Protocol (WAP), M-services, i-Mode and Web clipping. Although other protocols are also possible, WAP appears to provide a proper framework for the content sharing. Therefore, adoption of standards such as WAP is suitable for the purpose of the present invention, and it is discussed in some detail below.

The adoption of WAP builds on existing Internet standards and protocols adapted for use in wireless communication networks and addresses the unique characteristics of mobile wireless devices (with limited computing, memory, display, user interface, and power capabilities). WAP is a specification suite defining a set of protocols for presentation and delivery of wireless information and telephony services on mobile wireless devices. WAP services provide information access and delivery to WAP-enabled devices. WAP was designed to empower users with easy and instant access to information and interactive services. Thus, interoperability between WAP-enabled device is possible through any WAP-compliant infrastructure to deliver timely information and accept transaction and queries.

WAP can be built on any operating system, including PalmOS, EPOC, Windows CE, FLEXOS, OS/9, JAVA OS etc. Being air interface independent, WAP is designed to be scalable to new networks as they develop, allowing bearer independence and development of common solutions across disparate networks.

The term "WAP" is commonly used to refer to the wireless application environment (WAE) although it is WAE that includes the WAP suit of protocols and technologies. WAE provides the rich application environment which enables delivery of information and interactive services to mobile wireless devices. An important aspect of the WAE is the WAP stack, namely the wireless protocol layers, as shown for example in FIG. 1. At the bottom of the WAP stack 11 is a network layer, topped by the transport layer, the security layer, the transaction layer, and the session layer.

Briefly, the network protocol layer supports network interface definitions, governing interface with the networks of wireless service providers (wireless bearers) such as short message service (SMS), code division multiple access (CDMA), cellular digital packet data (CDPD), general packet radio service (GPRS), high speed circuit-switched data (HSCSD), third generation (3G), GSM (global system for mobile communications), and unstructured supplementary service data (USSD) channel. The wireless transport layer supports the wireless datagram protocol (WDP), and when operating over an IP (Internet protocol) network layer WDP is replaced with user datagram protocol/IP (UDP/IP). WDP offers to the upper protocol layers a datagram service and transparent communication over the underlying bearer services. In other words, WDP offers to the upper protocol layers a common interface to and ability to function independent of the type of bearer wireless network. The wireless transport layer security (WTLS) provides a secure transport service to preserve the privacy, authentication and data integrity of the transport service at the layer below, as well as the ability to create and terminate secure connections between communicating applications. The transaction protocol (WTP) layer provides transaction oriented protocol for the WAP datagram service, including, for example, request-response transactions. The wireless session protocol (WSP) layer provides HTTP/1.1 functionality and features such as session suspend/resume. The WSP provides the upper-level application lever of the WAE with an interface to connection and connectionless services operating above the transaction protocol and the datagram transport layers, respectively.

The WAE (i.e., the wireless application environment) is further fashioned with a wireless markup language (WML) micro-browser, a WML script virtual machine, a WML script standard library, a wireless telephony application interface (TAI), and WAP content types. The WAP micro-browser, also referred to as the "WAP browser," facilitates interaction between WAP/Web applications and WAP-enabled devices. The micro-browser is a tag-based wireless browser application supporting wireless markup language (WML), and extensible transport hyperlink markup language (XTHML). The micro-browser uses the "card" metaphor for user interface, where user interactions are split into cards. The WAP card metaphor provides a common interface to which all applications can conform, much like the desktop metaphor in PCs. The micro-browser supports user actions, defined at tree levels (deck, card, and select & link options, i.e., ACCEPT, PREV, etc.) and default tasks (PREV, NOOP, etc.). For example, a deck of cards is split into a navigation card, variables card, and input elements card. A navigation card is formed as a script encapsulated with the 'card' tags. The following example of a card includes the type of interaction (DO TYPE="ACCEPT") and link (GO URL="#eCARD").

```
<CARD>
    <DO TYPE="ACCEPT">
    <GO URL="#eCARD"/>
    </DO>
    WELCOME!
</CARD>
```

B. Wireless Communication Infrastructure

Figures 1, 3:
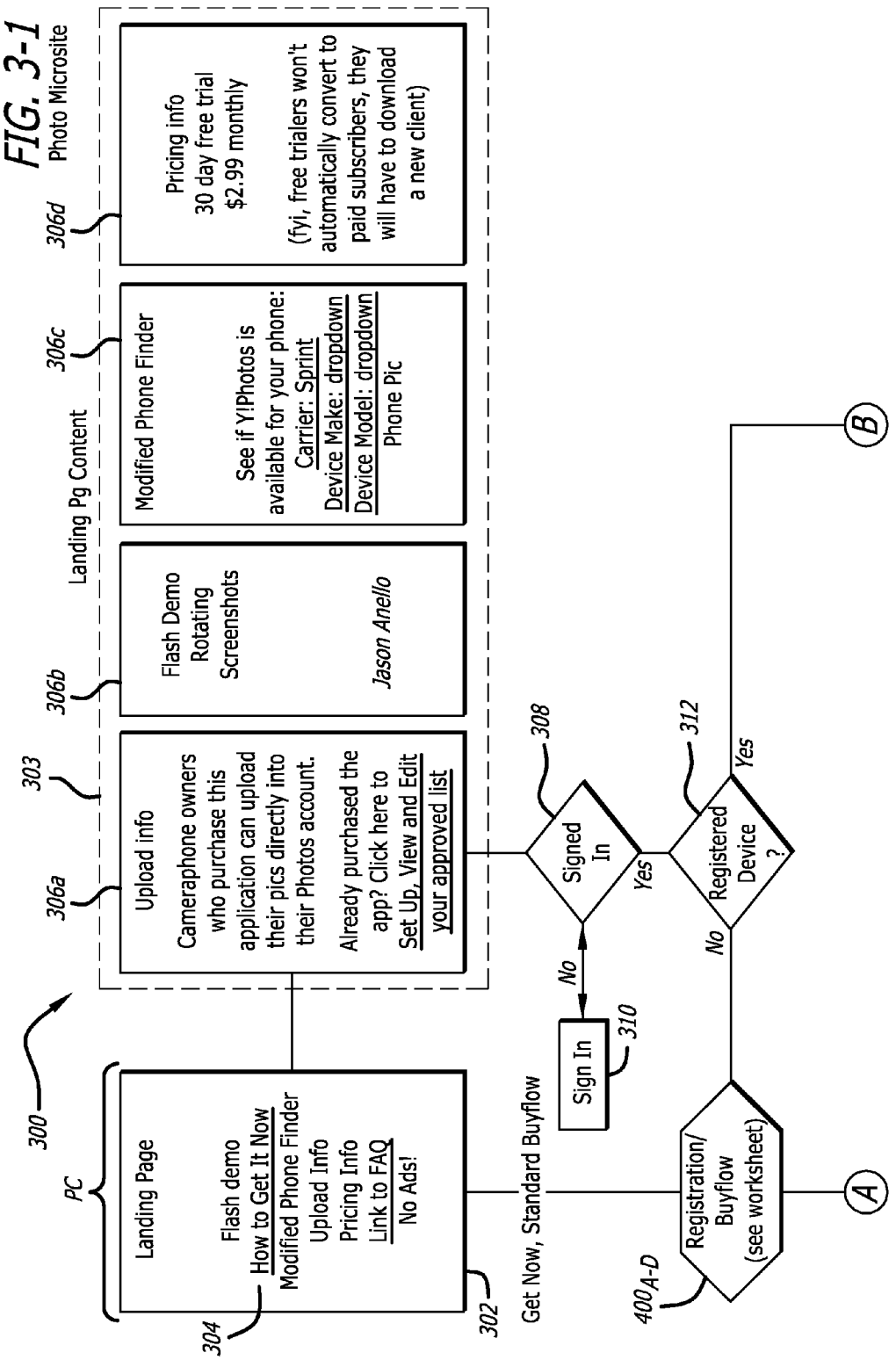
FIG. 1 shows a wireless interconnection model using one of the many types of available bearer networks.
FIG. 3 illustrates the flow once users reach the Yahoo! Photos landing page.
Figures 2, 3:
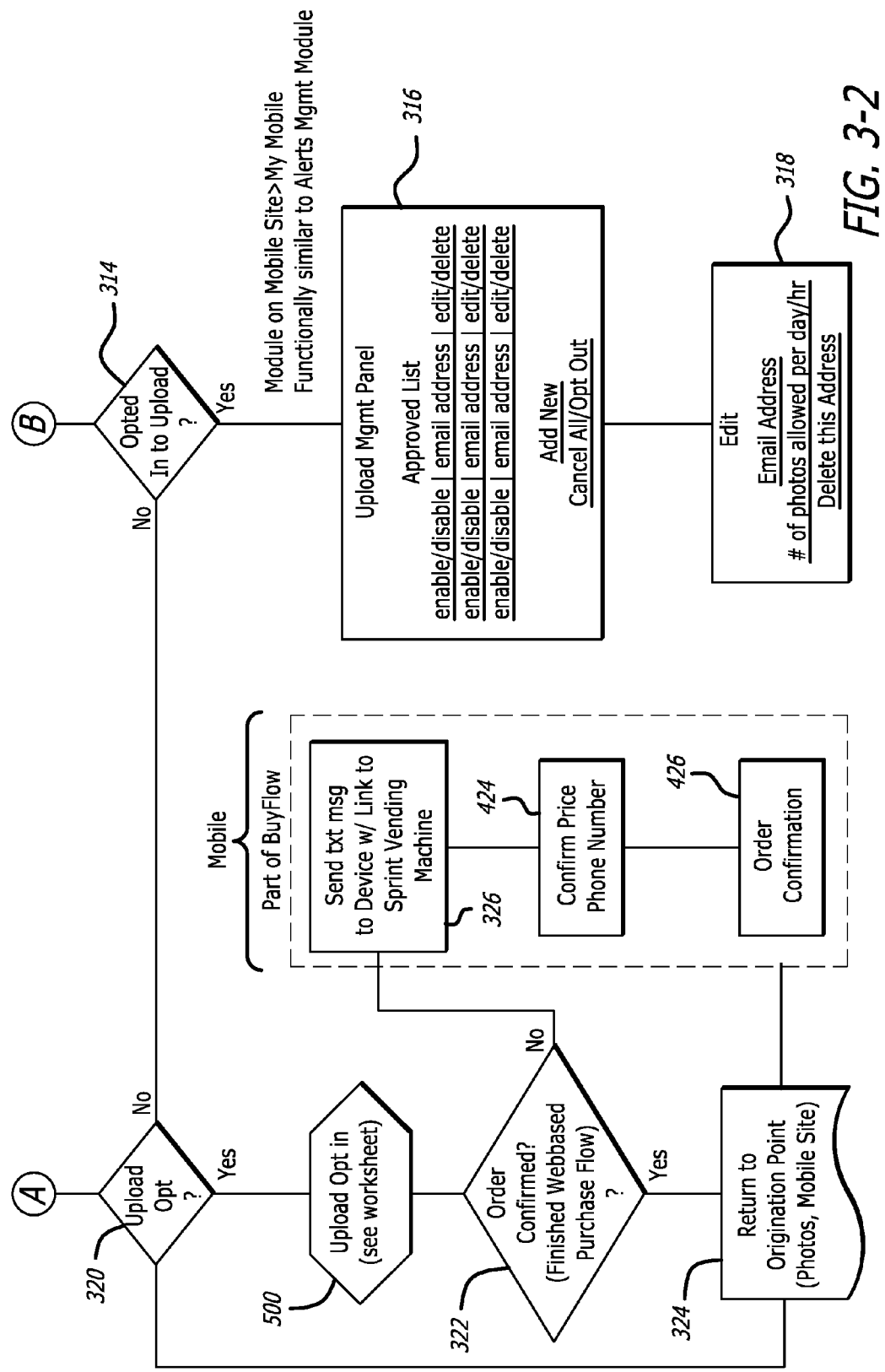

FIG. 1 shows a wireless interconnection model 10 using one of the many types of available bearer networks 12. The illustrated wireless mobile devices 100 are presumed to have sufficient local memory and Internet access capability to allow a user to download programs from servers 18 through the Internet 16 (and any other network such as LAN, WAN or Ethernet network) and store them in the local memory. Thus, wireless subscribers can gain fast access to content in these or other servers via the Internet through various downloadable applications. Note that the illustrated server 18 can be the origin of downloadable programs as well as the origin, or destination, of content; although programs and content can originate at or be destined for different servers. For the purpose of this illustration, the web server 18 is the source of the Yahoo! Photos client side application as well as the source, and destination, of content, particularly photos (image data). Using the downloaded program, such as Yahoo! Photos, and with multimedia capabilities, including the ability to retrieve e-mail, and push and pull information via the Internet, network operators (or, more generally, service providers) add value propositions beyond voice or text offerings.

Indeed, with this capability, users can capture photo images in their mobile devices, store and manipulate the captured images, and upload data of the captured images to a server (e.g., server 18). Thus, the server 18 operates as a repository for the data of photo images, and users can download from the server to their mobile devices data of previously captured photo images, as well as store and manipulate such images. Photos resident on one mobile device can be shared with another via the server 18 and the communication network(s) 12 and 16.

In this wireless interconnect model, the mobile phones used to download the Yahoo! Photos client side program are WAP-enabled. As shown in FIG. 1, the WAP-enabled devices 100 support the WAP protocol and the server 18 typically supports the WWW (world-wide web) protocol. In particular, the wireless application environment at the mobile device side 11 includes the micro-browser, a suite of WAP protocols at the network through session layers, and the downloadable (client-side) Yahoo! Photos application program. The micro-browser defines how WML documents and WML script applets should be interpreted and presented to the mobile device user. The Micro-browser's WTA (wireless telephone application) functionality provides call control, phone book access and messaging within WML script applets to allow selective call forwarding or other secure telephony. The wireless application environment at the server side 13 includes the server-side Yahoo! Photos in addition to a standard web browser and WWW protocol stack (HTTP and TCP/IP).

To enable web-based access to content, service providers deploy wireless data through the carrier network 12 while controlling the data communications to their subscribers and tracking the billable activity. Typically, the gateway 14 is tasked with tracking subscriber activities, controlling access and, in addition, functioning as the proxy for the mobile device 100, on the one hand, and for the server 18, on the other hand. The gateway 14 is implemented, building on standard web proxy technology, to interconnect the services offered by the wireless service providers to the HTTP protocol so as to permit access to content on the wired Internet.

One model of interaction between a WAP-enabled device, the WAP-enabled proxy/gateway, and the server, is the Hypertext Transfer Protocol (HTTP) 1.1 response/request transaction, where HTTP 1.1 is profiled for the wireless environment. The gateway (13 & 14) translates requests from the WAP protocol to the WWW protocol, and vice versa; translating WML(/HTML) documents to HTML(/WML), resolving domain names in URLs and providing a control point for managing access. From the WAP-enabled gateway with encoders/decoders, the URL requests or WML documents (possibly in encoded form) can be sent encoded/decoded to add security to the user interaction. Note that, unlike the flat structure of HTML documents, WML documents are divided into a set of user interaction units, namely a deck of cards. Each user interaction unit is a card (or page), and the user can navigate between cards in one or more WML documents.

Another model of interaction between a WAP-enabled device, the WAP-enabled proxy/gateway, and the server, is the HTTP response/request transaction (protocol running on top of the Internet's TCP/IP suite of protocols). This model is appropriate for the newer WAP 2.0 (with protocol stack not shown in FIG. 1). Unlike the above-mentioned, and illustrated, WAP stack 11, WAP 2.0 stack includes the IP, TCP (transmission control protocol), TLS, HTTP and WAE layers atop the network layer (all of which are profiled for wireless environment). For example, the wireless profile for the TLS protocol will permit interoperability for secure transactions.

Yet another model of interaction via bearer networks, between $3^{rd}$-generation (3G)-enabled mobile devices and servers or other devices, is shown in FIG. 1A. As shown, a 3G terminal supports higher-speed, wider-band wireless cellular service communications based on various technologies, including wide code division multiple access (W-CDMA), general packet radio service (GPRS), global system for mobile communications (GSM), enhanced data rates for global evolution (EDGE), unified threat management system (UMTS), and high speed circuit switched data (HSCSD). A 3G terminal is equipped with cordless connections for local, short distance communications. The communication protocols in the 3G terminal are comparable to the open system interconnection (OSI) protocols, layered in the OSI stack.

Various services are supported by these protocols, including web browsing, short message service (SMS), multimedia messaging service (MMS), e-mail, M-commerce, real-time video, and pre-paid. The MMS, for example, is a store and forward messaging service capable of adding multimedia elements to SMS, including images, text, audio clips, and video clips. MMS is synchronized across a common timeline, rather than being discrete like e-mail and SMS; it is akin to a presentation layer over e-mail and looking like a slide show with images. On a compatible phone, the MMS message will appear with a new message alert. The picture message will open on the screen, the text will appear below the image and the sound will begin to play automatically.

Downloadable applications such as Yahoo! Photos and network games are likewise supported in the 3G terminal and interact with services such as MMS. The originator can easily create a multimedia message, either using a built-in or accessory camera, or can use images and sounds stored previously in the phone (and possibly downloaded from a web site). However, for simplicity, the following description assumes that the mobile device is a WAP-enabled camera phone used for downloading photo applications such as the Yahoo! Photos.

Figure 2:
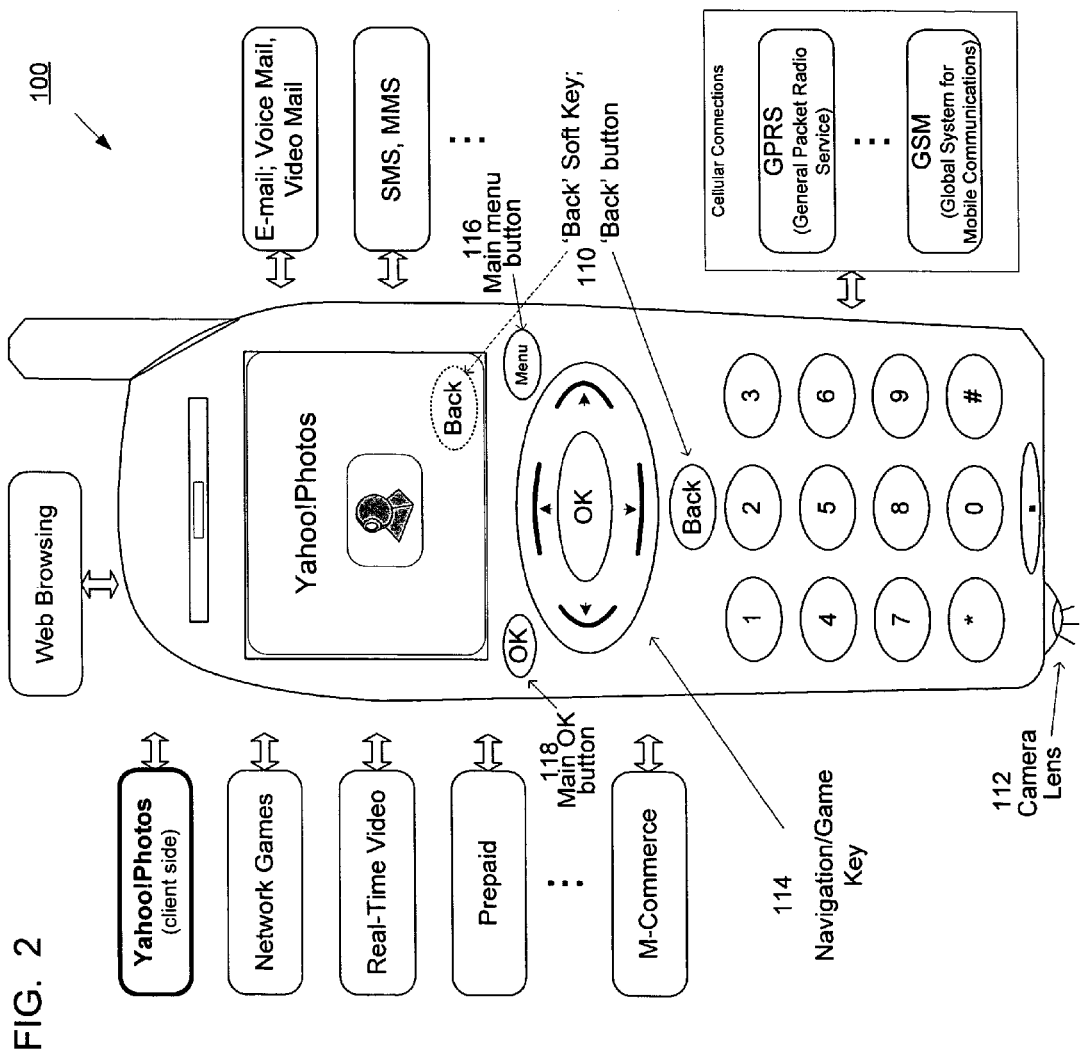
FIG. 2 shows a mobile phone with features associated with the present invention.

FIG. 2 shows a mobile phone 100, not necessarily associated with any particular manufacturer, but with features suitable for the purpose of the present invention. For example, to accommodate the Yahoo! Photos application, the mobile phone 100 has a camera feature with the camera lens 112 exposed for capturing images. The mobile phone 100 also has a 5-point navigation key (also called game key) 114, and it features left, right, up, down and selection, or 'OK,' functions, substantially mimicking the operations of a mouse. The main menu button 116 activates the menu display on the screen, and the main OK button 118 activates a menu selection. The 'back' button 110 is shown as a hardware key whose position here is merely exemplary. Namely, the physical placement of the 'back' button is device dependent, where it is anticipated that buttons on different devices may be arranged differently. A 'back' soft-key is possible to implement a 'back' function of the WAP browser, which means that it would show up as an icon or menu item on the screen of the mobile phone.

As further shown in FIG. 2, the Yahoo!-enabled phone 100 supports wireless cellular service communications based on various technologies such as the GPRS and GSM. This device is configured for supporting WAP communication protocols (at all layers of the WAP stack). Various services shown as being supported by these protocols, include web browsing, SMS, MMS, e-mail, M-commerce, real-time video, and pre-paid. The downloadable programs shown to interact with such services include the network games and Yahoo! Photos.

The mobile device functionality is preferably implemented using a platform, such as the J2ME™ platform, which is tailored for a broad range of embedded devices including mobile phones. The J2ME™ platform includes a set of standard Java APIs (application programming Interface), and provides a user interface, a security model, built-in network protocols (e.g., WAP, as shown in FIG. 1), and support for networked and disconnected applications (Yahoo! Photos is a networked application).

With the J2ME™ platform, applications are written once for a wide range of device. Applications leveraging each device's native capabilities are then downloaded dynamically. The J2ME™ platform defines configurations, profiles and optional packages as elements for building complete Java run time environments. Configurations are composed of a virtual machine and a minimal set of class libraries and provide the base functionality for a particular range of devices that share similar characteristics. Current configurations include connected limited device configuration (CLDC) for devices with limited memory and processing capabilities (e.g., mobile phones, two-way pagers, and PDAs) and connected device configuration (CDC) for devices with better memory, processing and network bandwidth capabilities (e.g., TV set-top boxes, residential gateways, in-vehicle telematics systems, and hi-end PDAs). However, in order to provide a complete runtime environment targeted at specific device categories, the configurations must be combined with a set of the high-level APIs, or profiles, that further define the application life cycle model, access to device-specific properties, and user interface.

One example of profiles is the mobile information device profile (MIDP) which is designed for mobile phones and entry-level PDAs. MIDP offers a core application functionality required by mobile applications, including user interface, network connectivity, local data storage, and application management. The J2ME™ can be further extended by combining various optional packages and their corresponding profiles to address specific market requirements, e.g., Bluetooth™, web services, wireless messaging, multimedia, and database connectivity.

The Upload Security in the Context of Mobile Yahoo! Photos

Note that the example here focuses on the camera phone, but the principles of the present invention are not limited to camera phones. Any phone or other wireless mobile device can embody a variation of the present invention. When the mobile device is a smart handset, downloading application programs and implementing the upload security scheme are possible even though the communications with the service provider may be different in character.

It should be mentioned that, although the manufacturer provides the Yahoo!-enabled phone 100 with camera functionality—i.e., functionality for capturing images, and saving, displaying, manipulating, transmitting and receiving data of image—this camera functionality is independent from the Yahoo! Photos program. That is, data of the captured images reside in the mobile phone outside the Yahoo! Photos environment until such time that this data is introduced to the Yahoo! Photos environment by being first uploaded to the Yahoo! server and then downloaded to the local (mobile) Yahoo! Photos album, as will be later explained.

On mobile devices, various client application programs are offered to the user on a default start-up or main menu screen or on a manufacturer-installed virtual vending machine screen. Other selection items include, for example, the menu item for setting the sound. These start up and vending screens show a menu with a list (or icons) of applications which the user can obtain by following an install procedure. The menu provides links to various service web sites, including, for example, the Yahoo! Photos site. The links, of course, are URLs (Uniform Resource Locator)—i.e., the world wide web address of a site on the Internet, and on the Yahoo!-enabled phone, at least one such menu item is the link for downloading the Yahoo! Photos application.

FIG. 3 illustrates the flow once users reach the mobile application site, which, in this example, is the Yahoo! Photos landing page. The URL for the landing page is obtained via a link from a promotional web page, through a web search, or from a bookmark (or favorites). The flow is shown as originating on a user's PC (personal computer) and it commences with program information presented at the landing page 302 on the PC display. The contents 303 and 304 of the landing page is presented to show the options available to the user based on whether or not the user has already purchased the Yahoo! Photos program. For instance, the landing page presents to the user the Yahoo! Photos program name with the option of "how to get it now" 304, as well as upload information 306a, flash demo 306b, and pricing information 306d, say, "$2.99 monthly." To buy the application the user clicks on the application name, Yahoo! Photos, or on "how to get it now." Subsequent to the registration $400_{A-D}$, a query (such as "would you like to buy it for $2.99?") prompts the user to accept/reject the offer 320. Then, for the purpose of implementing upload security, the user is prompted to establish upload opt-in parameters 500, as will be later explained.

If the user accepts the offer to buy the application, the order is confirmed 322 and the application is downloaded into the mobile phone, becoming resident on the mobile phone. FIGS. 4A-4D show the respective PC-based and mobile-based registration and buy flow diagrams.

Figure 4A:
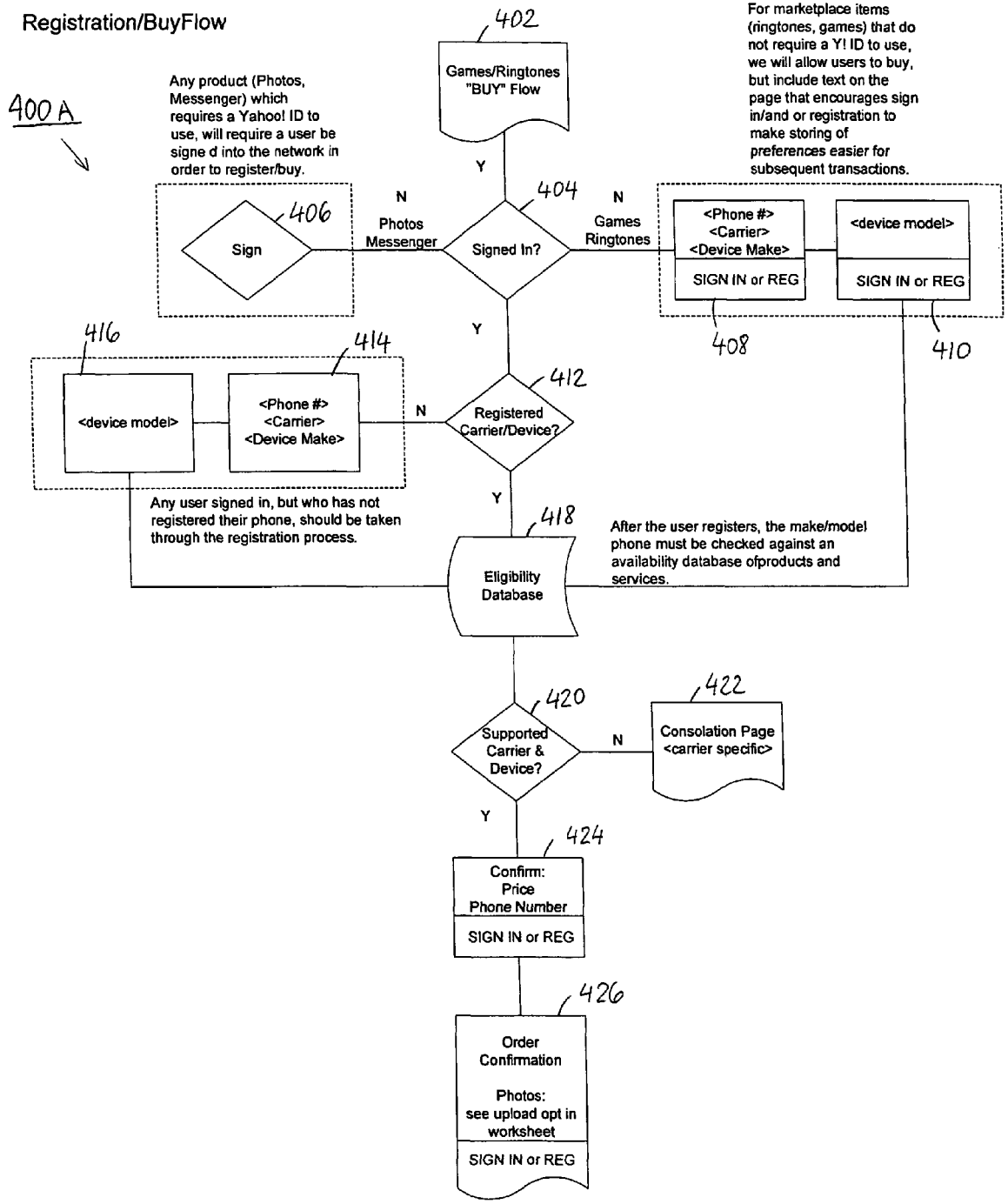

Incidentally, as shown in FIGS. 3 and 4A, if the user confirms acceptance, assuming the user has an account on the server having signed in before, the user is prompted to provide the telephone number of the mobile phone. With that phone number, the server sends a short message embedded with a link to the mobile phone and causes the mobile phone to vibrate or, otherwise, signals the user with a message requesting confirmation of the purchase 326. With this confirmation 426 the server proceeds to send the program to the mobile phone.

Figures 2, 4B:
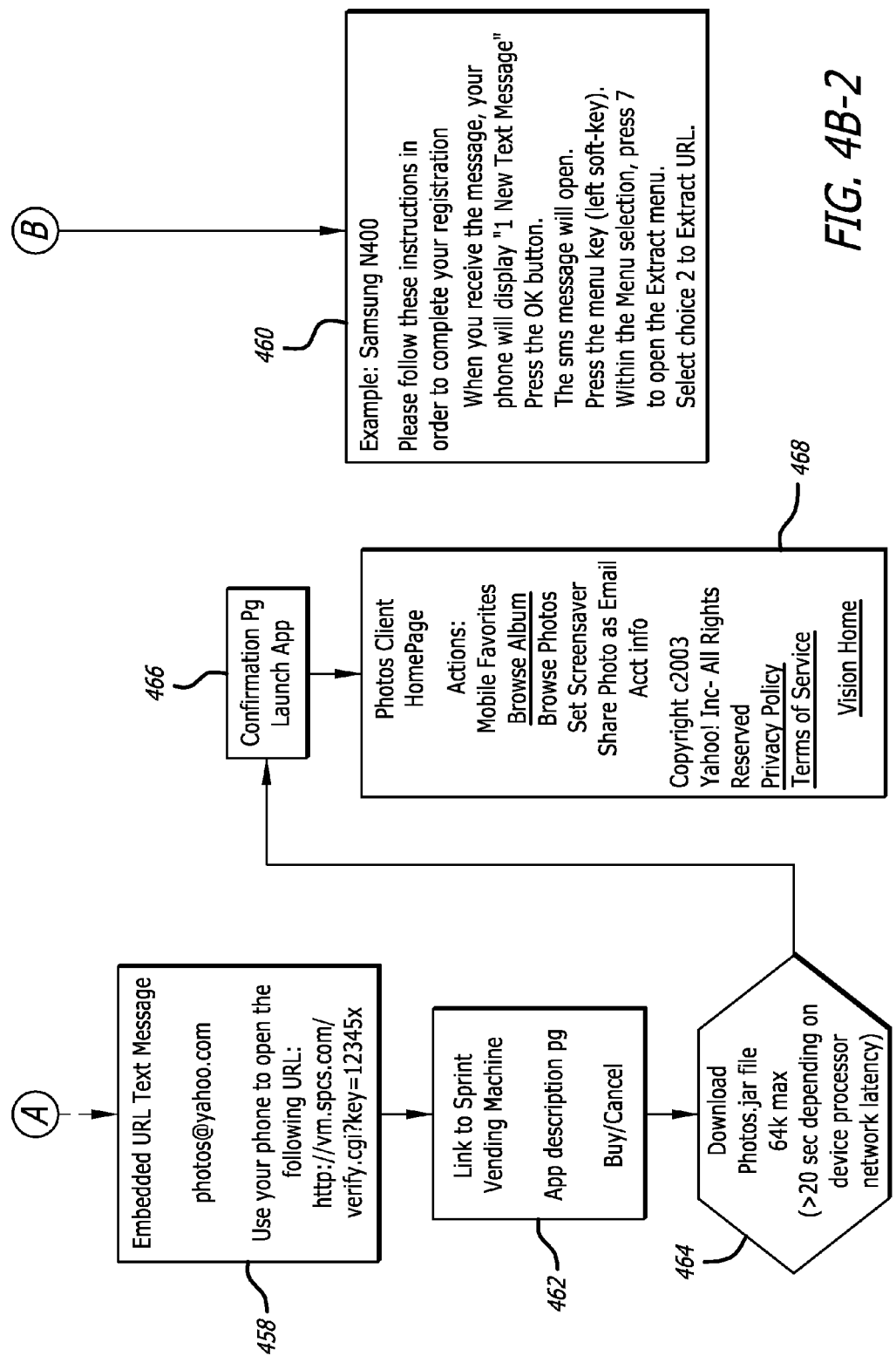

As shown in FIGS. 4B and 4C, registration can originate on the PC or the mobile phone. In the PC-based registration process, once, the compatible phone list is reviewed 450 and the phone is deemed compatible, registration can go forward starting with the user entering the 10-digit mobile phone number 452. The service provider dials the 10-digit phone number and requests confirmation from the user via that mobile phone 456. The user is also prompted to follow the buy instructions 460 or follow the link to the vending machine 458. Once the download takes place the Yahoo! Photos client home page 268 is presented on the mobile screen. Alternatively, rather than indirectly via the PC, a program such as Yahoo! Photos can be purchased directly via the mobile phone, as shown in FIG. 4C. That is, the registration process originating from the mobile phone is launched from the menu page, e.g. Yahoo! home pages 470 or 472. Beyond that, the link to (virtual) vendor machine page 462, download page 464, confirmation page 466 and home page 468 are similar to those in FIG. 4B.

FIG. 4D shows a first-time purchase flow. As can be seen, the purchase can originate either at the PC or the mobile phone, starting with the respective landing page. Note that in the PC-based process the landing page 480 is obtained via a standard browser. In the mobile-based process, the landing page 482 presents the WAP sites, assuming the mobile phone is WAP compliant and uses the micro-browser for linking to this and subsequent pages. Then, for a first time purchaser the product information (i.e. Yahoo! Photos application) is introduced along with price and links to terms of use and buy/cancel selection buttons (icons) 486. Download activation 488, progress update 490 and confirmation 492 are provided along the way when the application is loaded. The application is then ready to launch on exiting the micro-browser 494. After being invoked, the home page of Yahoo! Photos is displayed 498.

Figure 5:
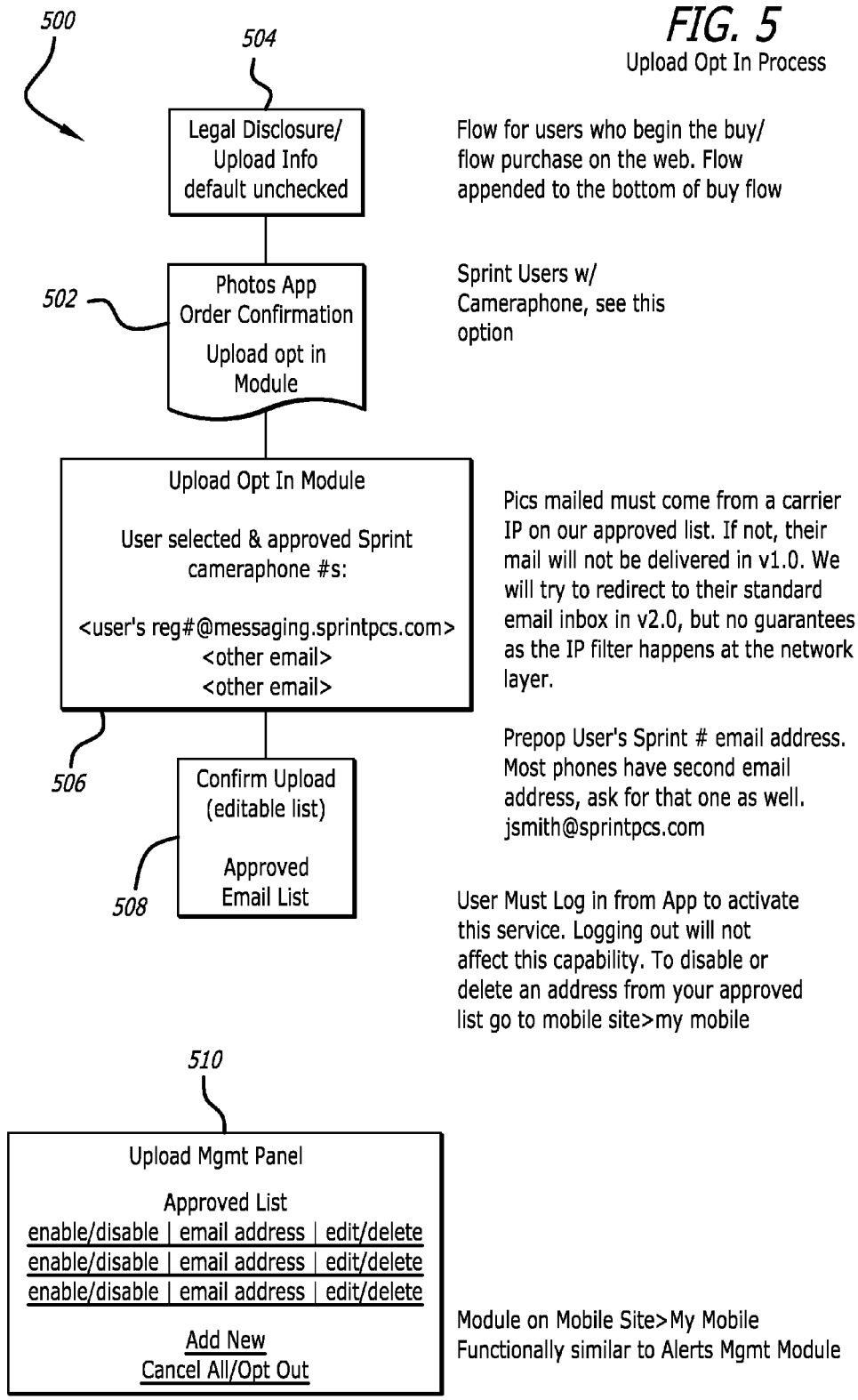
FIG. 5 shows the upload opt-in process.

For implementing upload security, as mentioned above, the registration and buy process of FIG. 3 includes setting the upload opt-in 500 parameters. FIG. 5 shows an upload opt-in process 500 for setting the user's upload parameters that establish the user's upload preferences (once the upload opt-in module is invoked 502). Preferably at the PC, the user is prompted to enter the service provider-issued phone numbers of mobile phones authorized by the user to upload their photos to the user's Yahoo! Photos account (on the server) 506. The user is additionally prompted to enter one or more of the user's e-mails, e.g., <user reg.#@messaging.sprintPCS> or other e-mails, e.g., <jsmith@sprintpcs.com>, through which the photos are uploaded to the user account 506. The e-mails are posted on the approved list. Although it is not shown, the user can additionally pre-select the maximum number of upload messages the user wants to receive in a day (or any other predefined period of time). At the end of this selection process the user is prompted to confirm the entries 508 before they are stored in the database for future reference. An upload Management Panel 510, shows the approved list of email addresses with functionality to add new email addresses to the approved list, enable/disable or edit/delete particular email addresses existing in the approved list.

Figures 1, 6A:
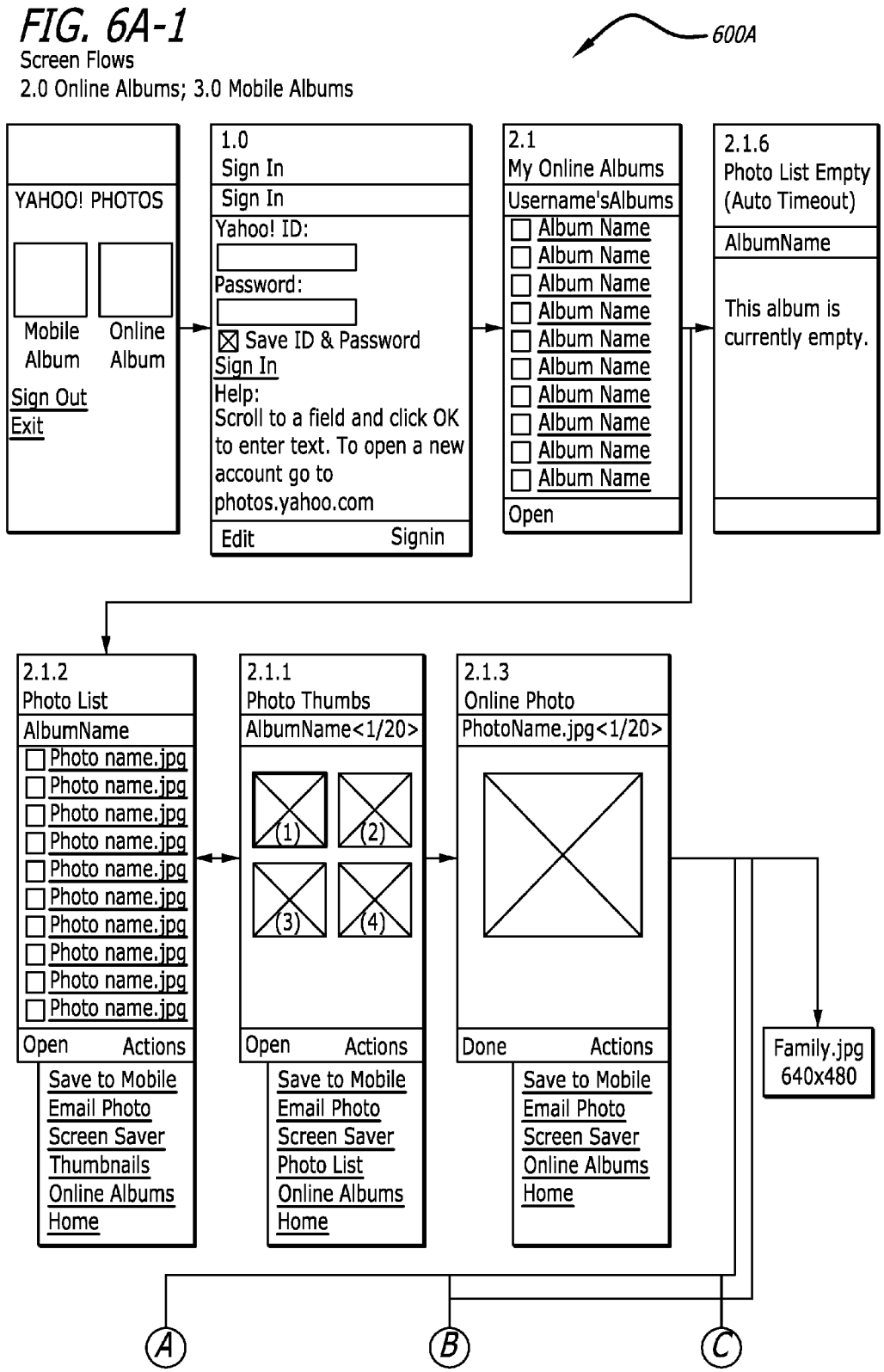
FIGS. 6A and 6B show the screen flows for online albums and mobile albums, respectively.
Figures 2, 6A:
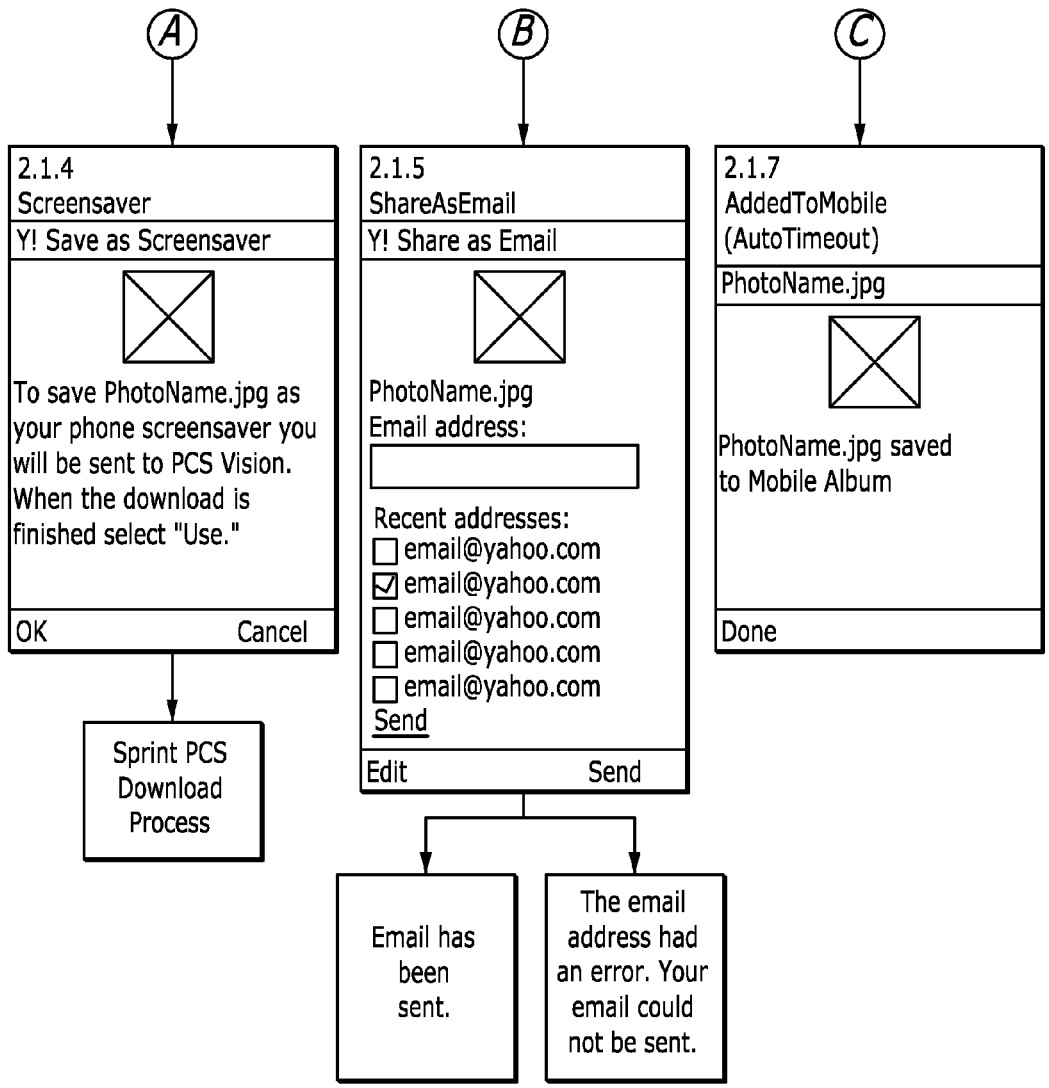
Figures 1, 6B:
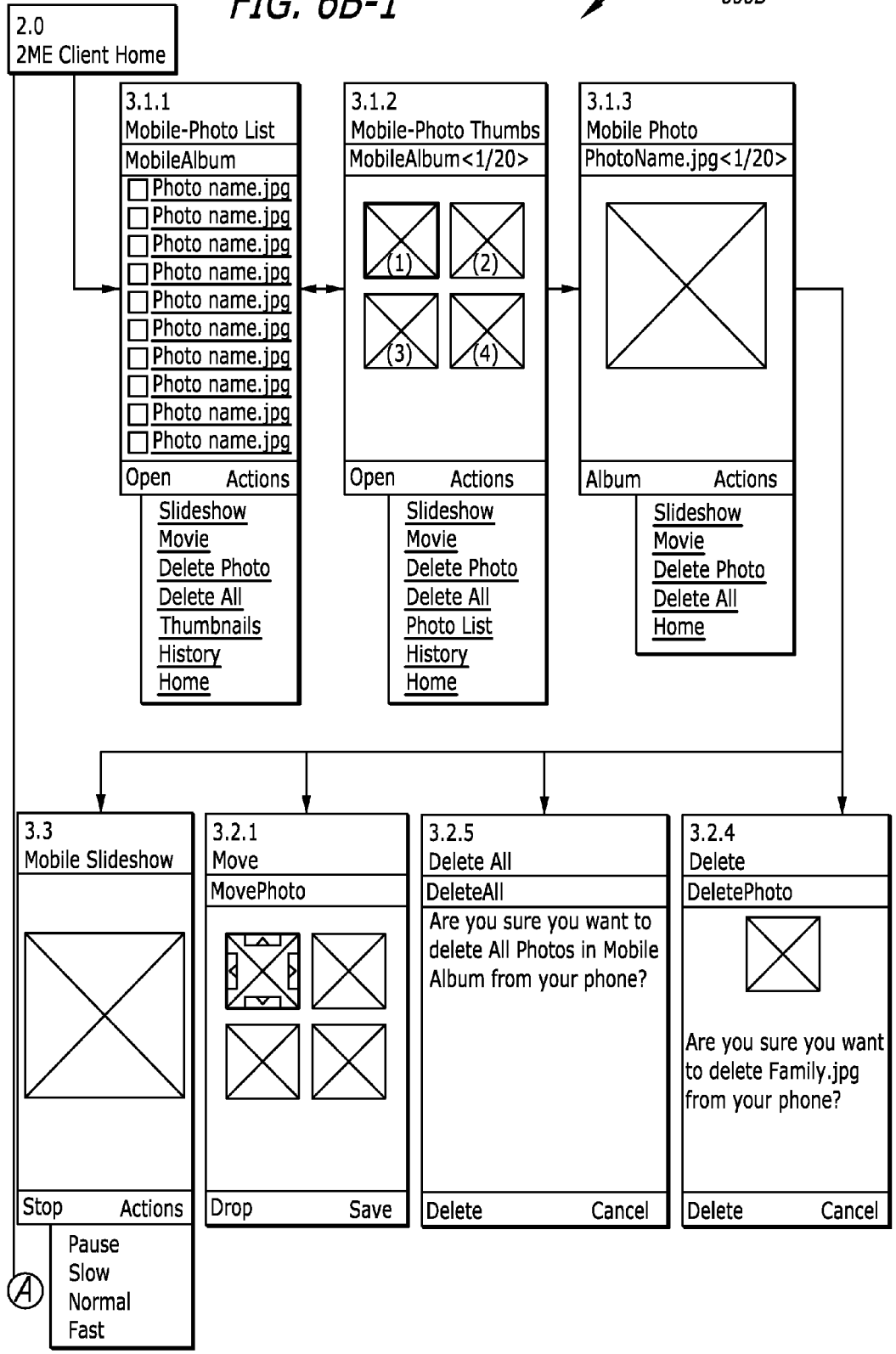
Figures 2, 6B:
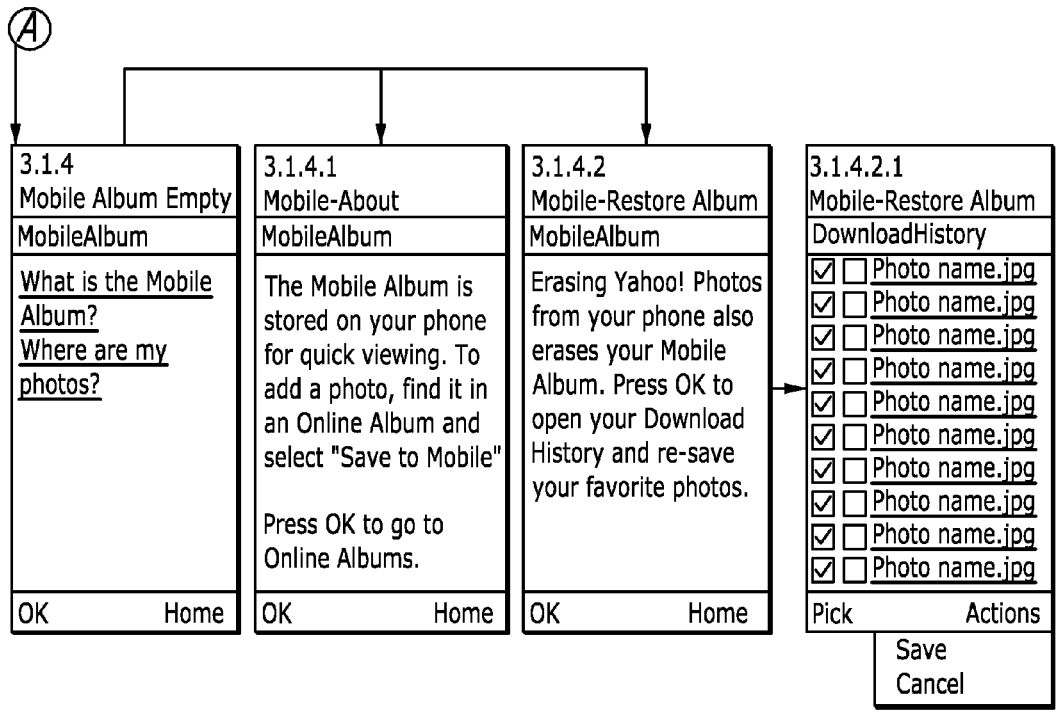

Once the Yahoo! Photos program is resident on the mobile phone it can be invoked from the landing page or menu page (using the menu button on the phone to bring up the menu or using the default menu if Yahoo! Photos is presented as one of the default menu options). Invocation of the Yahoo! Photos application allows, among others, user access and manipulation of the user's mobile album as well as online albums in the user account. FIGS. 6A and 6B show the screen flows for online albums and mobile albums, respectively.

Invocation of Yahoo! Photos prompts this program to display the 'home' page 2.0 with two main options: mobile album, and online album (as shown in FIGS. 6A and 6B). The mobile album is an album of photos stored locally on the mobile phone, so that the user need not go out over the network to obtain them. The online album is an album of photos stored on the server in the user's account. As mentioned before, photo images can be captured and manipulated by the mobile phone outside the Yahoo! Photos environment. These photo images will not be available at the mobile or online albums until they are uploaded to the server, stored in the online album and then (selectively or in batch) downloaded to the mobile album, and vice versa. Accordingly, selecting 'online album' allows the user to access and manipulate photo images that have already been uploaded to the server from the user's PC or mobile phone and stored in the online album. Likewise, selecting 'mobile album' allows the user to access and manipulate photo images that have been already downloaded from the server into the mobile album.

Then, if the 'online album' option is selected from the Yahoo! Photos client program 'home' page (2.0), as shown in FIG. 6A, it prompts the program to display the next page which is the 'sign-in' page (1.0). It requires the user to follow a sign-in procedure that typically includes providing a Yahoo! ID and user password. The sign-in procedure will, among others, bring up the user's account and relate it to the user's online albums. That is, the sign-in procedure allows the user to access his account via the Internet (and other proprietary network if applicable).

The next page is the 'my online albums' page (2.1). For the specific user, this online albums page lists the names of photo albums available to the named user which are associated with the user's account. Of course, only albums that are on the server are listed, and if the selected album is empty the next page will display an indication to that effect (i.e., "this album is currently empty" at page; 2.1.6). Alternatively, if the album is not empty, selecting that album will bring up the next page, the 'photo list' page for that album (2.1.2). In the 'photo list' page, a photo can be selected for downloading it from the server onto the mobile phone. Additionally, a selected photo can be opened or other actions can be invoked in relation to it. The other actions are presented in a menu that is shown on the screen as a pull-down menu, pop-up menu, or a menu superimposed on any part of the current page (in this example the menu is shown as a pull-down menu).

Such menu (hereafter "photo options menu") provides a number of selection items, each of each representing an action, including: 'save to mobile,' 'email photo,' 'screen saver,' 'thumbnails,' 'online albums,' and 'home.' Each selection brings up a page that corresponds to the selected action item. Two of the action items have already been discussed above, 'home' and 'online album.' Selecting home, will lead the user back to the home page (2.0), and selecting online album, will lead the user to the aforementioned 'my online albums' page (2.1).

Selecting 'thumbnails' brings up a 'photo thumbs' page 2.1.1 that shows a group of thumbnail photo images from the selected album. Note that the number of photo thumb groups downloaded from the server depends on the memory size of the mobile phone (or whatever device is used). With this feature, the user can then thumbnail through the groups of photos in the album. The groups of thumbnail photo images in this album are each loaded from the server. The user can then move between the images back and forth (scroll back and forth) and select any one of the photos in the 'thumbnails' page. A selected thumbnail image will be enlarged in the next page, the 'online photo' page (2.1.3).

As can be seen, each of the pages, 'photo list' (2.1.2), 'photo thumbs' (2.1.1), and 'online photo' (2.1.3), includes the photo options menu feature. Among these action items, when 'save to mobile' is invoked from the 'photo list' page, 'photo thumbs' page, or 'online photo' page, it causes the selected photo image (previously downloaded from the server) to be saved in the mobile album on the mobile phone. The 'added to mobile' page (2.1.7) is brought up in this case to show the photo being saved and to give an indication that saving is done.

When 'email photo' action is invoked, the 'share as email' page comes up (2.1.5). This page shows the photo(s) selected for emailing and prompts the user for the email address. In this implementation, a number of recently-used email addresses are provided. Incidentally, 'email' is simply a transport mechanism which is presently used to send photos from camera phones. Other transport mechanisms may be developed and employed for this application. Then, when the photo is emailed from the mobile phone to the selected e-mail address, a message pops up indicating that the email has been sent or, if not, that an error occurred. For example, a transmission will fail if the user is not authorized to upload photos to the selected e-mail. An error message of this kind is a product of the upload security scheme contemplated by the present invention, as embodied in the Yahoo! Photos application program. More details on the upload security are provided below with reference to FIGS. 8A, 8B and 8C.

When the 'screen saver' action is invoked, the selected photo will be used to populate the screen when the phone is idle, standing by, or starting up. The 'screen saver' option is associated with screen saver page (2.1.4) which shows the selected photo and requires the user to select 'OK' or 'cancel' to add this photo to the screen saver photo roster. A message pops up to indicate the status of the photo download.

Going back to the mobile album is possible with the photo options menu via the 'home' page, using the 'home' option as discussed above. Another way for getting to the mobile album or any other previous page is with the "back" action using the 'back' button, as will be later explained. Also, as mentioned above, when the Yahoo! Photos application is invoked from the landing/menu page, the 'home' page (2.0) presents the 'mobile album' as one of the selection items. Accordingly, the mobile album can be directly accessed via the 'home' page.

The mobile album screen flow, shown in FIG. 6B, starts with the 'home' page (2.0) and selection of the mobile album brings up the 'mobile photo' list page (3.1.1). This page presents two action menus, 'open' and 'action.' Thus, selection of any of the listed photos can be followed by selecting 'open' or 'action.' As before, when 'open' is selected the photo is shown on the screen in the 'photo thumbs' page (3.1.2). When 'actions' is selected, a mobile photo action menu is provided. This menu includes action items such as 'slide show,' 'move,' 'delete photo,' 'delete all' (photos), 'thumbnails,' 'history,' and 'home.'

Except for the photos being local (at the mobile album), the thumbnails feature, associated with the 'photo thumbs' page (3.1.2), works as described above with reference to the online album. A photo selected on the mobile 'photo thumbs' page can be enlarged as shown in the next page, the 'mobile photo' page (3.1.3). The menu for the 'photo thumbs' and 'mobile photo' pages includes a subset of the aforementioned mobile photo action menu.

When the slide show is invoked from such a menu the 'mobile slide show' page comes up (3.3). While this feature is active, the slide show will scroll through the mobile album photos, showing each photo for a certain period. The slide show will go on until the user selects 'stop' on the bottom of the page. If the user selects 'actions' a slide show menu gives the user the options of 'pause,' 'show,' 'normal,' and 'fast.' The 'pause' option is selected for pausing the slide show; 'slow' will slow down the slide show, 'speed' will speed up the slide show, and 'normal' will bring it to normal speed. (FIG. 6C, parts (i) and (ii), describes setting up favorites for the mobile album slideshow; part (i) describes the process in the mobile device, and part (ii) describes the process originating at the PC).

Figure 6D:
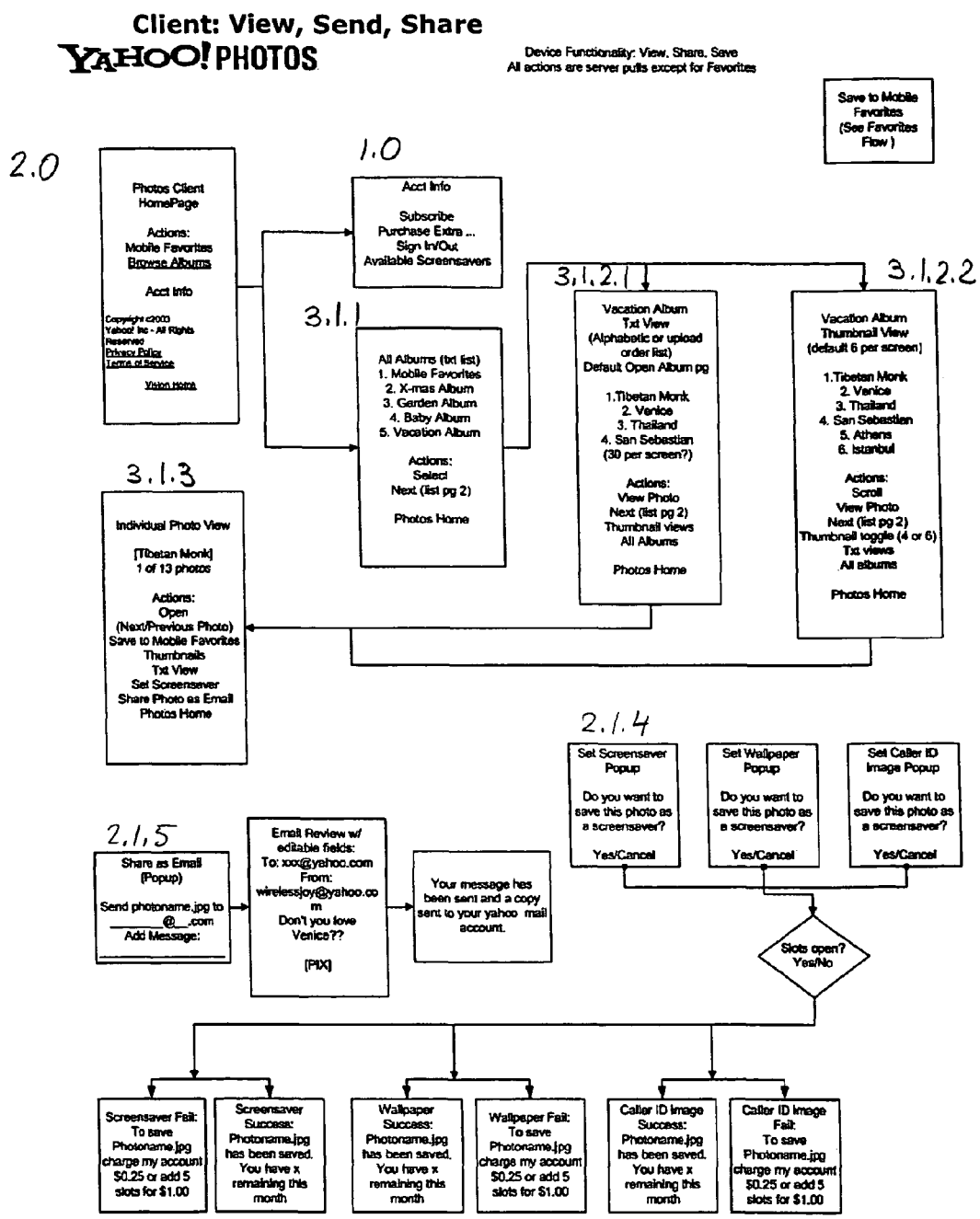
FIG. 6D shows flow diagrams for photos view, share and save.

As further shown in FIG. 6B, the 'move' page comes up (3.2.1) when the 'move' action (referred to also as 'rearrange' action) is selected from any one of the three pages (3.1.1, 3.1.2 and 3.1.3). In this page, the program displays a group of photos (thumbnails) and the user can rearrange the photos using the 5-point navigation key, as well as choose to drop a photo or save it (FIG. 6D shows flow diagrams for photos view, share and save). When the 'delete' or 'delete all' actions are selected, the user has the option of deleting or canceling the delete action (as shown in pages 3.2.5 and 3.2.4). The 'delete' page shows the photo selected for deletion to allow the user to change their mind. When all the photos are deleted, or when the mobile album is empty to begin with, the 'mobile album empty' page is displayed (3.1.4). It allows the user to select the home page or select the answer to any one of the queries, such as "where are my photos?" and "what is the mobile album?." Selection of the latter will bring up the 'about' page (3.1.4.1), and in this page pressing 'OK' provides user access to the online album(s). Selection of the former brings up the 'restore album' page 3.1.4.2. The "restore" function is explained in more detail below.

Note that, when the user signs in, the server associates the user's identification with his historical record so that the application program can record (backup) the photo in the server each time the user saves a photo to the mobile album. This historical record serves as a backup that allows the user to restore his album if the Yahoo! Photos program is erased, for any reason, from the mobile phone memory and the user then reloads this program. This history feature is useful to reduce the navigation for restoring the mobile album since the server maintains this information in the user's client account.

It is important to note that although the history feature is described in the context of the Yahoo! Photos program, it is useful in any mobile device application where backup is desired. Thus, although this feature is implemented for the Yahoo! Photos application, it can be implemented more generically for other applications.

In the Yahoo! Photos context, every photo from the user's online album that is saved to the mobile album is 'remembered' by the server. Preferably, since the page traversal path is not predictive the history is recorded accurately and fully. This is made possible with the association of the user's Yahoo! ID to a user's historical record on the server that records all photos saved by the user to the mobile album. Moreover, since each mobile phone device is distinct, and a user may have more than one device, each device can in principle have its own distinct historical record. However, it can be arranged when the user first establishes or later updates his account that the user's Yahoo! ID is associated with a plurality of mobile phones and, upon signing in, the user can have access to his historical record from any one of these mobile phones. Thus, in a situation where the Yahoo! Photos program is deleted somehow or photos in the mobile album are erased for some reason the historical record provides a mobile album backup for restoring that album.

To that end, when the user reloads the application, it will query the user as to whether the user wishes to restore any of the mobile album photos. That is, when the user selects the query "where are my photos?" (in page 3.1.4) the 'restore album' page is displayed (3.1.4.2). As with the previous page (3.1.4), this page allows the user to go to the 'home' page (2.0) and, this time via 'OK', it allows the user to go to the next mobile 'restore album' page (3.1.4.2.1) for a historical photo download list (of photos previously downloaded to the mobile phone).

Figure 6E:
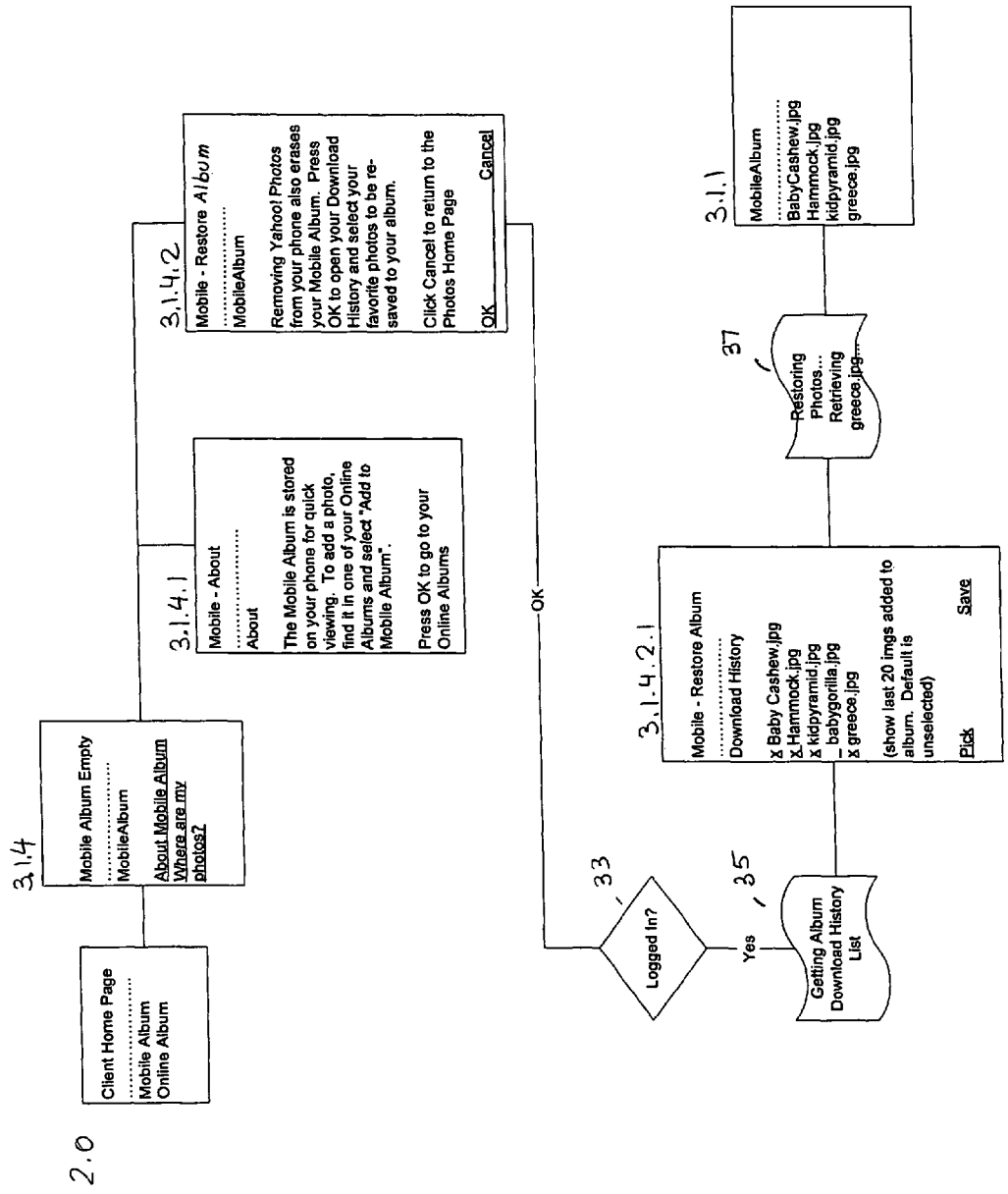
FIG. 6E illustrates the flow of restoring the mobile album from the server backup.

FIG. 6E illustrates in more detail the flow of restoring the mobile album from the server backup. Specifically, after traversing the 'home' and 'mobile album empty' pages (2.0 and 3.1.4), the user lends on the 'restore album' page (3.1.4.2). On selecting the 'OK' option, if the user is logged in the Yahoo! Photos server responds with the download history list of photos (steps 33, 35). This response prompts the mobile device to bring up the 'restore album' page (3.1.4.2.1) with the download history list of, say, 20 last photos that were added to the mobile album. From this historical list, the photos can be picked (see, e.g., checkmarks) and then the selected photos can be restored to the mobile album using the save/cancel menu options. The selected photos are then downloaded from the server in a batch process (step 37). The mobile album is then available for user access via 'mobile album' page (3.1.1).

Note that the pages shown in FIGS. 6A-6E and discussed herein are exemplary rather than exhaustive, and they do not necessarily include all possible pages (or user interaction cards) that a photo application such as Yahoo! Photos presents. Moreover, the reference designations (call-out numbers) typically refer to the pages themselves rather than any portion of their content. Where applicable, similar pages appear in different figures with the same call-out numbers, e.g., home page 2.0, although their respective contents can vary slightly.

Figure 7:
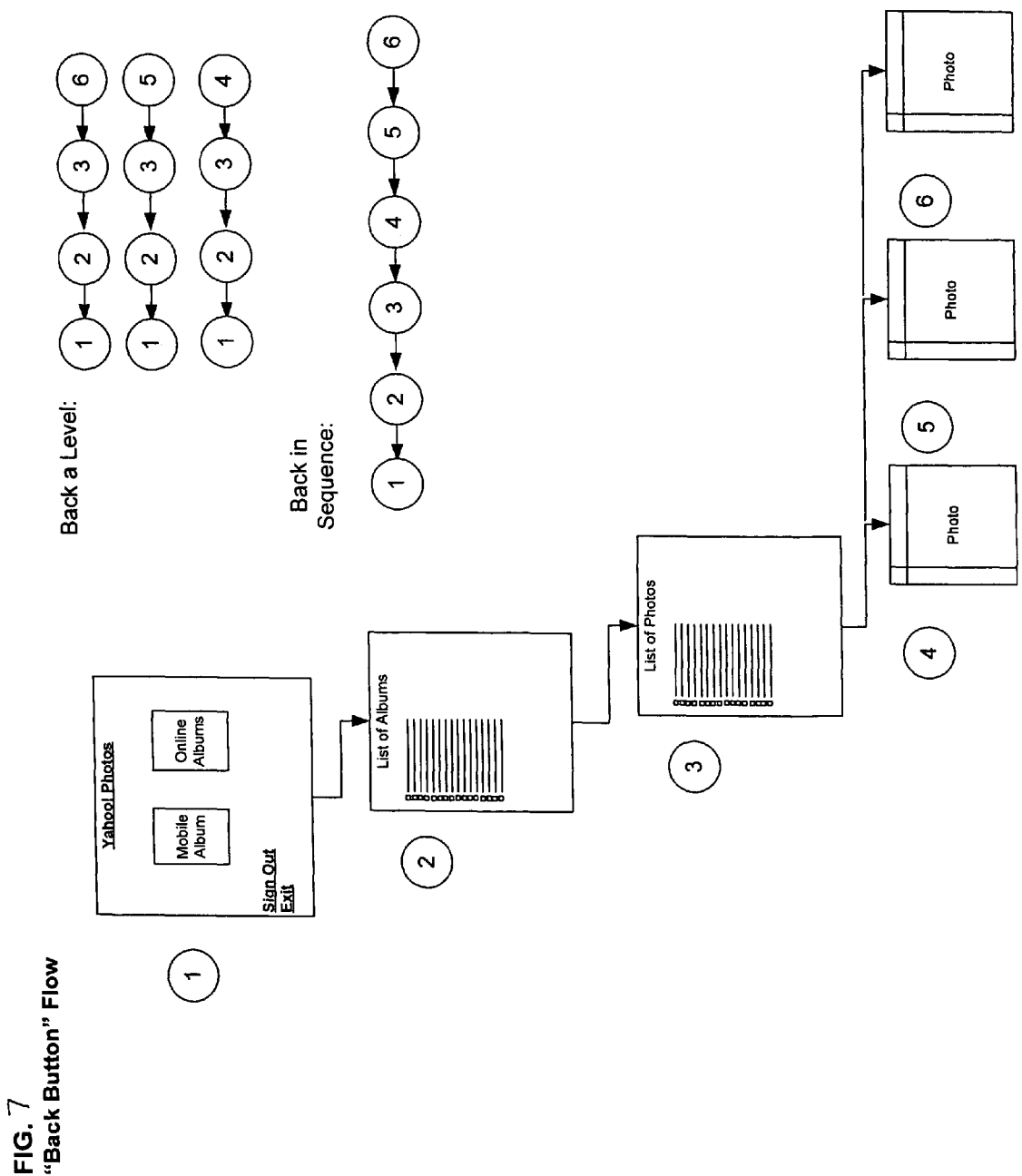
FIG. 7 provides a simplified diagram to illustrate the back button feature.

As to navigating through the pages on the mobile phone, the pages can be traversed forward as described above and they can be traversed backwards using the "back button" feature. FIG. 7 provides a simplified diagram to illustrate the "back button" feature. As can be seen, the "back a level" mode allows hierarchical backwards sequence traversal one level each time the 'back' button is touch activated or clicked (hereafter "clicked"). The "back in sequence" mode allows sequential backwards one page each time the 'back' button is pressed. For example, in back a level mode, back a level takes the application from a photo page (e.g., 6) one level up to the list of photos page (3); and from there one more level up to the list of albums page (2) and one more level up to the home page (1). As can be further seen in this example, the back in sequence mode functions to take the application from the current photo page (6) to the former photo page (5), rather than up one level (3), when the back button is touched. Additional activations of the back button will traverse through all the pages in reverse sequence.

It makes no difference if the "back button" feature is used while in the online album or mobile album part of the application. The principles apply equally well to both situations. Either way, the steps (pages traversed) are remembered, and they can be recorded server side, locally, or both on the server side and locally.

Having mentioned it in the above overview of the Yahoo! Photos application, we turn again to upload security for a more detailed description of this scheme in the context of Yahoo! Photos. As indicated, the idea is to provide a new scheme for uploading photos to online accounts in a secure manner so as to prevent spam and unauthorized uploading. At the outset, the upload security scheme involves an opt-in process (500 in FIGS. 3 and 5) which prompts the Yahoo! Photos user to pre register phone numbers of camera phones that will be authorized to upload to the user's Yahoo! Photos account. For each phone authorized, the user can also pre-select the maximum number of upload messages the user wants to receive in a day (or any other predefined period of time). At the end of this selection process the phone number, the carrier, and the message limit are stored in the database for future reference. At any point subsequent to the opt-in phase, when an email photo upload to a Yahoo! Photos user account is conducted from any camera phone, the upload security scheme refers to the user's predetermined upload parameters for authorization of the photo upload via that email. In particular, when the 'email photo' action is invoked by a user, the 'share as email' page (2.1.5) comes up on the user's mobile device and shows the photo(s) selected for emailing. The page also prompts the user for an email address for the upload.

In one possible implementation, a number of recently-used destination email addresses are provided. The user can select one of these emails or enter a new destination email address. The user will send the photo to that address, provided however that the user is allowed to upload photos to that destination user's Yahoo! Photos account.

Figure 8A:
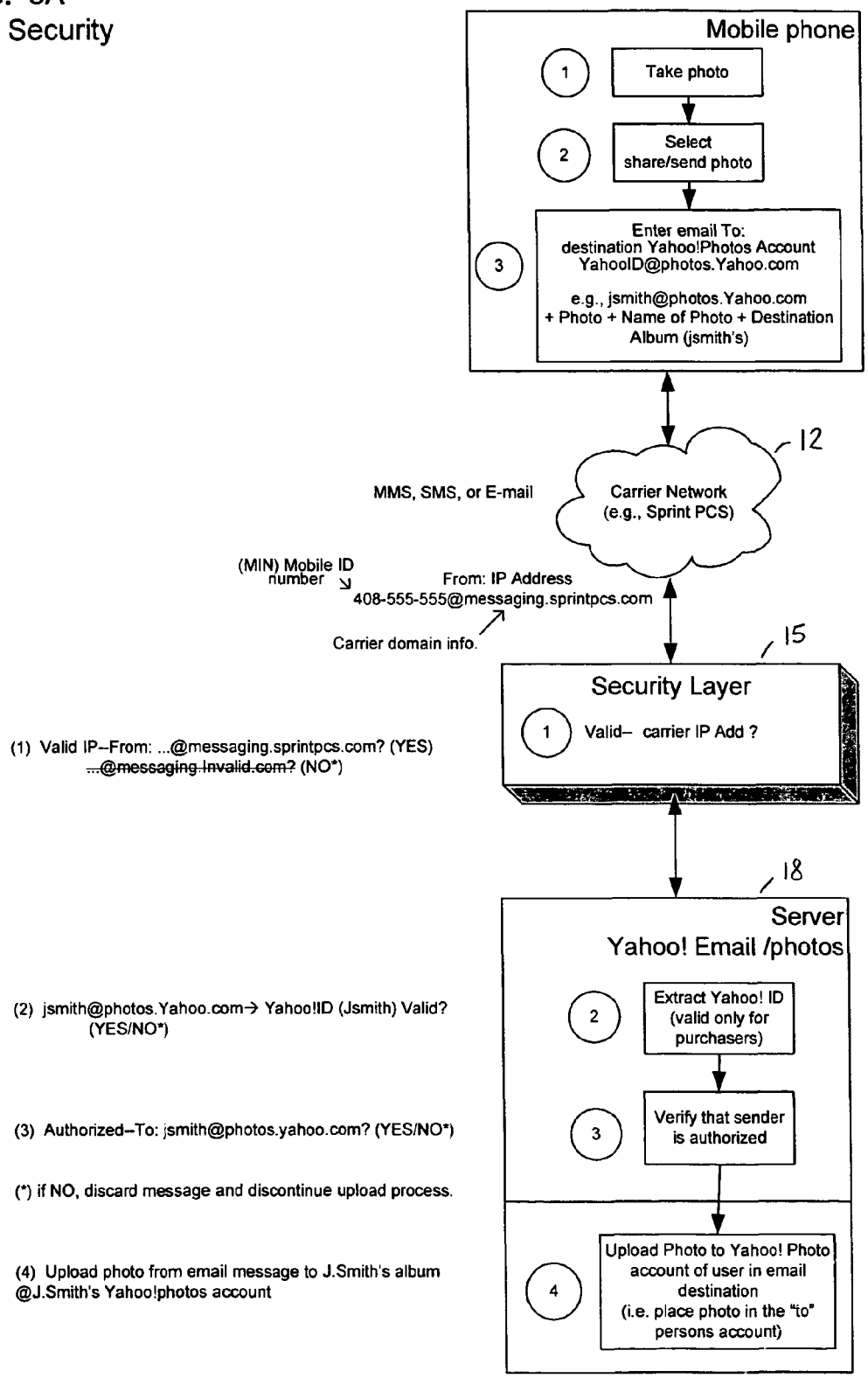
Figure 8B:
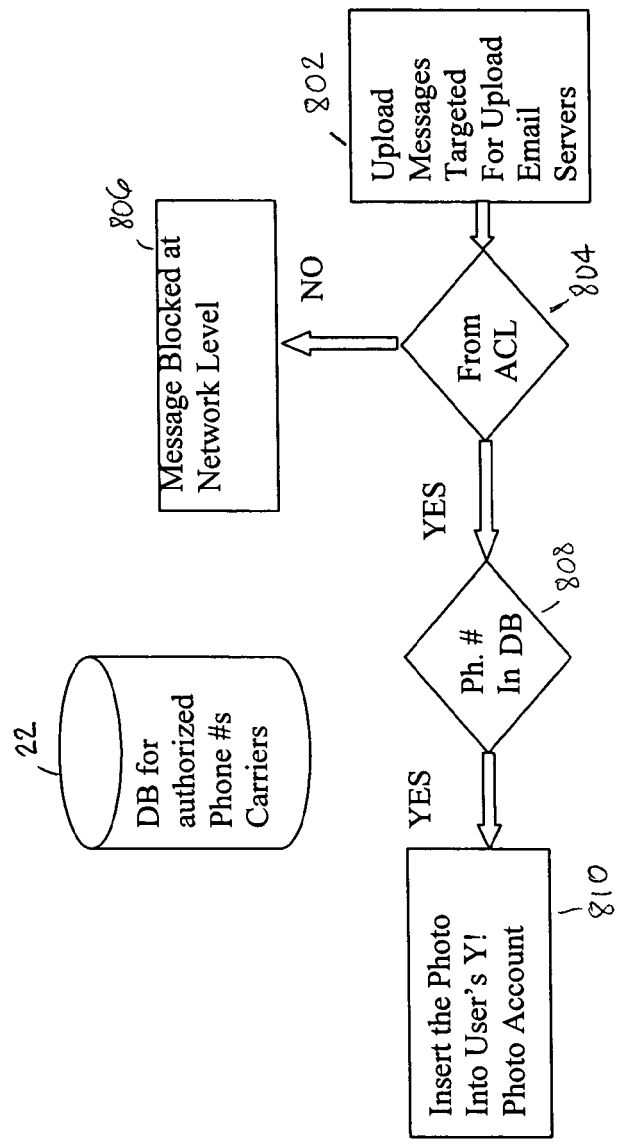

FIGS. 8A-C show the upload security scheme when a photo is destined to Yahoo! Photos upload e-mail servers. The diagram in FIG. 8A shows the various system components' position in the upload security scheme, and the flow diagram in FIGS. 8B-C illustrate various aspects of the process, including upload rules. Although the example is shown with some details it is intended merely to convey the idea not to limit it to one implementation.

In this example, the step 1 shown in FIG. 8A, includes taking the photo on the mobile camera phone. Step 2 varies with each device, and it might be 'share' or 'send' the photo from the mobile phone. Step 3 includes prompting the user to enter the destination email address.

As noted above, even though this looks like a standard email address, the recipient does not actually receive an email in his or her Yahoo! Mail inbox. Rather, email is the transport mechanism and the emails are sent to Yahoo! Photos upload e-mail servers. Each photo message is identified with a particular Yahoo! Photos user account. This email address takes the form: Yahoo!ID@photos.Yahoo.com. Suppose that the destination Yahoo! ID is JSmith, then the email is ("To:") jsmith@photos.Yahoo.com and the Yahoo! Photos upload e-mail server identifies this email with JSmith's Yahoo! Photos account. In a different version, in addition to the photo, this email includes the photo name and destination album (JSmith's album) on the Yahoo! Photos Server.

The email transport protocol in this instance is SMTP (simple mail transfer protocol defined in STD 10, RFC 821), which is commonly used to transfer electronic mail between computers. Among others, MMS and SMS protocols are possible alternatives. SMTP is typically a server to server protocol, so other protocols are used to access the messages. The SMTP dialog usually happens in the background under the control of the message transfer agent, e.g. sendmail, but it is possible to interact with an SMTP server using telnet to connect to the normal SMTP port. The local host (of the carrier) is typically identified by the IP address of its gateway.

Once the destination is known, the email is sent from the mobile phone to the server, i.e., Yahoo! Photos upload email server 18 (note that Yahoo! email and Yahoo! Photos are shown as being handled by the same server, but other configurations are possible). On its way to the server, the photo email is transported via the carrier network (e.g., Sprint PCS network) 12 and is first transmitted to carrier's SMTP Server. The carrier SMTP server then forwards the messages to Yahoo! Photos upload SMTP servers.

At the carrier's server (not specifically shown but represented by the carrier network 12), the email sender's mobile phone number (mobile ID number) is identified and combined with the carrier's domain information to form the email source ("From:") IP address, say, 408-555-555@messaging-.sprintpcs.com. As soon as the photo message arrives at Yahoo! network, the IP address of SMTP server that originates the photo message is checked for validity at the security layer (in step 1 of the destination side). An invalid carrier domain renders the IP address invalid and on such determination the security layer blocks the email from proceeding further, where the Yahoo! Photos upload email server does not receive the blocked email. An IP address that is deemed valid by the security layer 15 is allowed to proceed to the Yahoo! Photos upload e-mail server 18.

After the photo message arrives at the Yahoo! Photos upload e-mail server, the Yahoo! ID, i.e., JSmith, is extracted from the destination email address, i.e., jsmith@photos.Yahoo.com (in step 2 of the destination side). The phone number and the carrier are extracted from the source address of the photo message. The phone number and carrier info are then used to check if the extracted destination Yahoo! ID has given permission to upload to the destination user's Yahoo! Photos account. As an example, let us assume that the extracted sender's mobile phone number is 408-555-555 and the carrier is SprintPCS. In addition, the extracted destination Yahoo! ID is JSmith. The server will then check the database to see if the phone number and carrier is in JSmith's approved upload list. This is to verify that JSmith authorized the sender (i.e., mobile phone 408-555-555 with SprintPCS) to upload photos to JSmith's Yahoo! Photos account. Upon determining that the upload is permitted, the server uploads the photo to JSmith's Yahoo! Photos account. Otherwise, an unauthorized upload is discarded. In a different version, the unauthorized email is redirected to a standard email address.

Having established the roles of the system components in the upload security scheme we move to the process diagram in FIG. 8B. Again, one way upload security can be established is by access control using mobile phone numbers. For each user, the scheme requires the user to enter the approved mobile phone numbers. When an upload message is sent to the Yahoo! Photos upload e-mail server, the mobile phone number and carrier domain information are part of the "From:" IP address that accompanies the upload message. The phone number and carrier domain information are retrieved from the upload email message 802 and the carrier domain information and mobile phone number are checked to determine if the upload is authorized 806, 808, 810.

Approval of the carrier takes place at the security layer even before the message gets to the Yahoo! Photos upload e-mail servers. A network level filter is introduced in order to provide access control (using a list of SMTP gateways) based on IP addresses. This filter blocks all messages that are not from a global access control list (ACL) 804, 806. In this instance, the global access control list is built by collecting from Yahoo!'s carrier partners IP addresses of SMTP gateways used for e-mail photo sharing purpose. The messages sent from carriers that are not in the access control list are blocked at the network level 806. This way, the Yahoo! Photos upload email server receives only messages for uploading photos that are from carriers listed in the global ACL. Moreover, the ACL improves efficiency in that it insures that the server need not process email messages from unauthorized carriers or spammers and can focus its resources on processing emails from authorized carriers.

Once the server receives the email, the (sender's) phone number and the carrier are checked against the pre-authorized list in the database 22 which is associated with the destination user. If the pair of phone number and carrier exists in this list 808, the photo will be retrieved and inserted into the user's Yahoo! Photos account 810. Otherwise the message will be discarded. This insures that only photos sent from the mobile phones that are authorized are inserted into user's photos account.

Finally, we turn to the flow diagram in FIG. 8C for an overview of the upload rules. An email message sent to jdoe@photos.yahoo.com 902 is first filtered at the network security level 904. If it filters through the network security the message is routed to the Yahoo! Photos upload email server for further verification which involved one or more steps. In one variation of this scheme, only premium users (who are Yahoo! users, have logged in before and have purchased the Yahoo! Photos application) who have a right to selectively grant access to upload photos can upload their email photo messages 906. Otherwise, the message is discarded 930 or, optionally, redirected to a standard Yahoo! Mail address (jdoe@yahoo.com) of the (destination) user 912. The recipient can proceed to accept the photo and manually upload and store select photos 914, 916, 918, 920. Then, whether or not the premium user feature is present and is turned ON/OFF, the next step 908 involves determining if the sender's mobile phone number is on the user's approved list and is authorized to upload the photo. If the sender's phone number is not on the approved list the email message is discarded 930 or, optionally, re-directed to the destination user's standard email address 912.

One limitation the user can impose is the number of uploads permitted in a period of time (e.g., day, hour or week). This limitation is set during user registration. Accordingly, the next step involves determining if the limit number, x, of permitted uploads is reached or not 910. If not, the upload can proceed, otherwise the message is discarded 930 or, optionally, redirected to the user's standard email address 912.

In one variation, a SMS message with embedded URL can be pushed to sender's mobile device if the sender is the owner of Yahoo! Photos account. The sender can then click the link and authorize uploading via a WAP session.

Once a photo is uploaded, the photo is stored in the user's account on the server 928. If, the user's album is specifically identified, the photo is directed to such album. If the photo name is identified the specific photo is uploaded and stored. It is anticipated that future photo programs will be designed with the capability to identify the photo by name and to identify the specific album to which the photo is directed.

In view of the above, the upload security scheme improves efficiency and controls access to user accounts. With the ever growing problem of rogue broadcasts, spasm and parasites, the controlled access of upload security helps block unwanted uploads.

Implementation Details

Additional implementation details associated with the foregoing description are provided below. These implementation details include an initial list of devices, soft key mapping, labels, global elements and screen flows tables for the online albums and mobile albums. These details are described in the following pages.

Possible Mobile Devices

The visual and interaction design as described herein should accommodate various types of mobile devices, including, for example, those listed in the table below.

| VENDOR | MODEL | USABLE PIXEL DIMENSIONS |
| --- | --- | --- |
| Audiovox | 8450 | 128 × 112 |
| Samsung | A660 | 128 × 146 (without Soft key) 128 × 131 (with Soft key: 15) |
| Sanyo | RL2000 (7200) | 120 × 112 (include soft key) |
| Sanyo | RL2500 (5400) | 132 (W) × 160 (H) including Soft key |
| Sanyo | 5500 | 132 (w) × 160(h) including Soft key |
| Sony Ericsson | T608 | 128 × 114 pixels |
| Toshiba | 9950 | 261 × 240 |
| Hitachi | SH-P300 | 120 w × 130 h |
| LG | 5350 | 120 × 96 |
| Samsung | A500 | 128 × 146 (without Soft key) 128 × 131 (with Soft key: 15) |
| Samsung | N400 | 128 × 114 (without Soft key) 128 × 102 (with Soft key: 12) |
| Samsung | A600 | 128 × 146 (without Soft key) 128 × 131 (with Soft key: 15) |
| Samsung | VGA1000 (A620) | 128 × 146 (without Soft key) 128 × 131 (with Soft key: 15) |
| Sanyo | 4900 | 120 × 112 includes Soft key |
| Sanyo | 5300 | 132 × 160 (includes soft key) |
| Sanyo | 8100 | 128 × 120 (with soft key) 120 × 112 (without Soft key) |

Soft Key Mapping

For the purpose of this invention, the following keys are available on the mobile devices: Up; Down; Left; Right; Select/OK; Left Soft key; Right Soft key; and Back. If a device does not have an obvious select key, it is assumed that the MIDP (mobile information device profile) implementation will automatically provide a select option at one of the soft keys or in one of the soft key menus.

| KEY MAPPING | |
| --- | --- |
| Up | Scrolls the cursor up, or selects the previous item in a list. |
| Down | Scrolls the cursor down, or selects the next item in a list. |
| Left | Scrolls the cursor left if possible. |
| Right | Scrolls the cursor right if possible. |
| Select | LINK OR BUTTON: Go to appropriate screen<br>EXCLUSIVE LIST (Radio buttons): Selects the radio button.<br>MULTIPLE LIST (Checkboxes): Checks and un-checks the checkboxes.<br>TEXTBOX: Takes the user to the text editor<br>TEXT STRING: Does nothing |
| Two Soft keys | Soft key functionality varies greatly among devices. The ordering and positioning of options can't be controlled with any degree of accuracy; the order shown indicates only the relative importance of the options.<br>In the examples presented herein, options are assigned a type (BACK, EXIT, ITEM)<br>The following layout is preferred:<br>Item 1: primary soft key<br>Item 2: If no others are present, secondary soft key should have item 2 as its label. If additional items are available they should be listed in priority order in the menu, which is accessed via the secondary soft key.<br>Primary soft key should have the same function as the 'Enter'/'OK' key |
| Back | 'Back' button links back to previous screen.<br>Does NOT link one level up in the navigation tree, unless that is the previous screen.<br>Does not link back to confirmation or error popups.<br>When technical constraints exist, data previously entered into fields may not be shown when user navigates back to a page. However, actual implementations may differ based on the technical constraints. |
| Default Selection | In general, the first item on a page is pre-selected (default item) unless the user has performed some action, like viewing or renaming an image. |
| Misc. keys | If arrow buttons on the side of the phone are available they should scroll down an entire page in a list or thumbnail screen.<br>Image names should appear bold/strong when displayed on an instructional screen, e.g. 2.1.4. Normal text should be used for lists of images.<br>In this document any underlined item is a link. Actual presentation of links, whether underlined or other, is determined by the device. |

Soft Key & Menu Labels

In a representative implementation, labels that may appear on a soft key are restricted to 7 characters. Menu-only items are restricted to 14 characters.

Common Labels

| | |
|---|---|
| OK | Performs the default action for a screen or for a selected item. Moves the user forward in a task. (e.g., opens an album or photo.) |
| Cancel | Used in addition to "Back" when an action was initiated and can be cancelled. Cancel usually performs same action as back, but is displayed to increase user confidence that the action was cancelled. |
| Edit | When possible, "Edit" links to a textbox editing screen. |
| Open | Opens a folder, message, file, etc. Should not be used for links not associated with files, folders, etc. |
| Back | "Back" label should be used only for the Back function described above. If possible, Back should always map only to the device back button. |
| Home | Links to the home screen of the MIDlet. |

Global Elements

Confirmation Popup

One type of global elements, presented as "Confirm Popup" screens, are used for displaying a confirmation to the user. The confirmation popup screens contain simple text such as "Done" or "Saved", and they disappears automatically after a short time.

In Progress Screen

The "in progress" screen informs the user that the application is waiting for a response from the server or is processing a request. Each device has a default screen with text and a moving graphic, and, alternatively, it is replaced with a Yahoo! Canvas screen.

Screen Flows: Online Albums

As described above, the online album pages are made available to the user in forward and backwards traversal; each page having default selection items associated with it. The forward traversal starts, of course, with the home page (2.0). The following tables outline for each page separately the default selection items available in that page for screen flows.

2.0 J2ME Client Home

| | | | | | |
|---|---|---|---|---|---|
| Default Selection | Mobile Album | | | | |
| | Label | Function | Pref. Location | Type | Priority |
| Actions | | Left soft key opens selected page. Numbers 1, 2, 3, 4 also open | Primary Soft key, OK Button | ITEM | 1 |
| Enter/OK | Open | | | | |
| Up Arrow | Select previous item | | | | |
| Down Arrow | Select next item | | | | |
| Left Arrow | Select next item | | | | |
| Right Arrow | Select previous item | | | | |
| Comments | Descriptive text and/or graphics will be added to this screen. Icons may be used in place of text links. "Sign Out" appears only when user is signed in. | | | | |

1.0 Sign In

| | | | | | |
|---|---|---|---|---|---|
| Default Selection | ID Field. | | | | |
| | Label | Function | Pref. Location | Type | Priority |
| Actions | Edit | Opens selected textbox for editing | Primary Soft key, OK Button | EDIT | 1 |
| | SignIn | Submits Form | Secondary Soft key | OK | 1 |
| | Back | 2.0 J2ME Client Home | Back | BACK | 1 |
| Up Arrow | Jumps up. | | | | |
| Down Arrow | Jumps down. | | | | |
| Left Arrow | — | | | | |
| Right Arrow | — | | | | |
| Comments | Cache as much as legally & technically possible. | | | | |

2.1 My Online Albums

| | | | | | |
|---|---|---|---|---|---|
| Default Selection | First Album, or last selected album in current session. | | | | |
| Primary Soft key | Open. Same as Enter. | | | | |
| | Label | Function | Pref. Location | Type | Priority |
| Actions | Open | Opens selected album to last-used view- 2.1.1 or 2.1.2. List is default. If album contains no images, opens 2.1.6 Photos List Empty. | Primary Soft key, OK Button | ITEM | 1 |
| | Back | Previous screen. | Back | BACK | 1 |
| Up Arrow | Jumps to previous item in list. If top item is selected, does nothing. | | | | |
| Down Arrow | Jumps to next item in list. If last item is selected, does nothing. | | | | |
| Left Arrow | — | | | | |
| Right Arrow | — | | | | |

2.1.1 Photos Thumbs

| | |
|---|---|
| Default Selection | One thumbnail is always selected. Selection is indicated by 2 pixel black border. When scrolling to a page either (1) or (4) is selected. When returning from a list view, full-screen view, or action screen the last selected image is selected. |

| | Label | Function | Pref. Location | Type | Priority |
|---|---|---|---|---|---|
| Actions | Open | Opens 2.1.3 Online Photo NOTE: pressing 1, 2, 3, or 4 opens the photo currently in that position. | Primary Soft key, OK Button | ITEM | 1 |
| | Add to Mobile Album | Saves image to mobile album and opens 2.1.7 Added to Mobile | Menu | ITEM | 2 |
| | Screen Saver | Links to 2.1.4 Save as Screensaver | Menu | ITEM | 3 |
| | Email Photo | Links to 2.1.5 Share as Email | Menu | ITEM | 3 |
| | Photo List | Links to 2.1.2 Photo List | Menu | SCREEN | 1 |
| | Online Albums | Links to 2.1 My Online Albums | Menu | SCREEN | 2 |
| | Home | Links to 2.0 J2ME Client Home | Menu | SCREEN | 3 |
| | Back | Previous screen | Back button | BACK | 1 |

| | |
|---|---|
| Up Arrow | When (3) or (4) is selected, jumps up to (1) or (2). When (1) or (2), moves up one row. |
| Down Arrow | When (1) or (2) is selected, jumps down to (3) or (4). When (3) or (4), moves down one row. |
| Left Arrow | Cycle through all thumbs on the screen, (4)-(1) then to the row above. Rows are added one at a time, so the top row shifts down when a new row is loaded. |
| Right Arrow | Cycle through all thumbs on the screen, (1)-(4) then to the row below. Rows are added one at a time, so the bottom row shifts up when a new row is loaded. |
| Comments | List loops back to beginning when user reaches last image. When looping to the beginning, the full screen refreshes with 2 rows of images. Each photo is surrounded by 2 pixels of white space. The selected photo has a 2 pixel black border. |

2.1.2 Photo List

| | |
|---|---|
| Default Selection | One item is always selected. When returning from a thumbnail view, full-screen view, or action screen the last selected image is selected. After deleting, the image in the spot that contained the deleted image is selected. |

| | Label | Function | Pref. Location | Type | Priority |
|---|---|---|---|---|---|
| Actions | Open | Opens 2.1.3 Online Photo | Primary Soft key, OK Button | ITEM | 1 |
| | Add to Mobile Album | Saves image to mobile album | Menu | ITEM | 2 |
| | Screen Saver | Links to 2.1.4 Save as Screensaver | Menu | ITEM | 3 |
| | Email Photo | Links to 2.1.5 Share as Email | Menu | ITEM | 3 |
| | Thumbnails | Links to 2.1.1 Photo Thumbs | Menu | SCREEN | 1 |
| | Online Albums | Links to 2.1 My Online Albums | Menu | SCREEN | 2 |
| | Home | Links to 2.0 J2ME Client Home | Menu | SCREEN | 3 |
| | Back | Previous screen | Back button | BACK | 1 |

| | |
|---|---|
| Up Arrow | Jumps to previous item in list. If top item is selected, does nothing. |
| Down Arrow | Jumps to next item in list. If last item is selected, does nothing. |
| Left Arrow | — |
| Right Arrow | — |
| Comments | File extensions are displayed. Items are displayed in order specified by the Yahoo! Photos system. User cannot rename, delete, or move photos. |

2.1.3 Online Photo

| | Default Selection | — | | | |
|---|---|---|---|---|---|
| | Label | Function | Pref. Location | Type | Priority |
| Actions | Done | Links to 2.1.1 or 2.1.2 | Primary Soft key | SREEN | 1 |
| | Add to Mobile Album | Saves image to mobile album | Menu | ITEM | 2 |
| | Screen Saver | Links to 2.1.4 Save as Screensaver | Menu | ITEM | 3 |
| | Email Photo | Links to 2.1.5 Share as Email | Menu | ITEM | 3 |
| | Online Albums | Links to 2.1 My Online Albums | Menu | SCREEN | 2 |

2.1.4 Save as Screensaver

| | Default Selection | Text entry field | | | |
|---|---|---|---|---|---|
| | Label | Function | Pref. Location | Type | Priority |
| Actions | OK | Initiates PCS Vision download process. | Primary Soft key, OK Button | SCREEN | 1 |
| | Cancel | Cancels operation and returns to previous screen | Second Soft key | SCREEN | 2 |
| | Back | Previous screen | Back | BACK | 1 |
| Up Arrow | — | | | | |
| Down Arrow | — | | | | |
| Left Arrow | | | | | |
| Right Arrow | | | | | |
| Comments | | | | | |

2.1.5 Share as Email

| | Default Selection | Text entry field | | | |
|---|---|---|---|---|---|
| | Label | Function | Pref. Location | Type | Priority |
| Actions | Send | Send. Sends email to recipients and user with link to image on web. Confirmation pops up for a moment, then user is returned to 2.1.1, 2.1.2, or 2.1.3. If email address was not formed correctly an error appears. | Secondary Soft key | ITEM | 1 |
| | Edit/Pick/OK | Opens textbox for editing, toggles state of checkbox, or sends. | Primary Soft key, OK Button | | 1 |
| | Back | Previous screen | Back | BACK | 1 |
| Up Arrow | — | | | | |
| Down Arrow | — | | | | |
| Left Arrow | — | | | | |
| Right Arrow | — | | | | |
| Comments | | | | | |

-continued

2.1.3 Online Photo

| | Home | Links to 2.0 J2ME Client Home | Menu | SCREEN | 3 |
|---|---|---|---|---|---|
| | Back | Previous screen | Back button | BACK | 1 |
| Up Arrow | — | | | | |
| Down Arrow | — | | | | |
| Left Arrow | Jumps to previous image in gallery. | | | | |
| Right Arrow | Jumps to next image in gallery. | | | | |
| Comments | Image should be as large as possible on any particular screen. | | | | |

2.1.6 Photo List Empty

| | Default Selection | | | | |
|---|---|---|---|---|---|
| | Label | Function | Pref. Location | Type | Priority |
| Actions | Back | 2.1 My Online Albums | Back | BACK | 1 |
| Up Arrow | — | | | | |
| Down Arrow | — | | | | |
| Left Arrow | — | | | | |
| Right Arrow | — | | | | |
| Comments | Displayed for a moment, then automatically links back to 2.1 My Online Albums | | | | |

Screen Flows: Mobile Album

As with the online album, the mobile album pages are made available to the user in forward and backwards traversal; each page having default selection items associated with it. Here again, the forward traversal starts, of course, with the home page (2.0). The following tables outline for each page separately the default selection items available in that page for screen flows.

3.1.1 Mobile Photo List

| | | | | | |
|---|---|---|---|---|---|
| Default Selection | One item is always selected. When returning from a thumbnail view, full-screen view, or action screen the last selected image is selected. After deleting, the image in the spot that contained the deleted image is selected. | | | | |
| | Label | Function | Pref. Location | Type | Priority |
| Actions | Open | Opens selected photo in 3.1.3 Mobile Photo | Primary Soft key, OK Button | ITEM | 1 |
| | Slideshow | Links to 3.3 Mobile Slideshow, starting show with current photo | Menu | ITEM | 2 |
| | Move | Links to 3.2.1 Move | Menu | ITEM | 4 |
| | Delete | Links to 3.2.4 Delete | Menu | ITEM | 4 |
| | Thumbnails | Links to 3.1.1 Mobile-Photo Thumbs | Menu | SCREEN | 1 |
| | Home | Links to 2.0 J2ME Client Home | Menu | SCREEN | 2 |
| | Back | Previous screen | Back button | BACK | 1 |
| Up Arrow | Jumps to previous item in list. If top item is selected, does nothing. | | | | |
| Down Arrow | Jumps to previous item in list. If last item is selected, does nothing. | | | | |
| Left Arrow | — | | | | |
| Right Arrow | — | | | | |
| Comments | File extensions are not displayed. | | | | |

3.1.2 Mobile Photo Thumbs

| | | | | | |
|---|---|---|---|---|---|
| Default Selection | One thumbnail is always selected. Selection is indicated by 2 pixel border. When returning from a list view, full-screen view, or action screen the last selected image is selected. After deleting, the image in the spot that contained the deleted image is selected. After Moving, the last moved image is selected. | | | | |
| | Label | Function | Pref. Location | Type | Priority |
| Actions | Open | Opens 3.1.3 Mobile Photo NOTE: pressing 1, 2, 3, or 4 opens the photo currently in that position. | Primary Soft key, OK Button | ITEM | 1 |
| | Slideshow | Links to 3.3 Mobile Slideshow, starting show with current photo | Menu | ITEM | 2 |
| | Move | Links to 3.2.1 Move | Menu | ITEM | 4 |
| | Delete | Links to 3.2.4 Delete | Menu | ITEM | 4 |
| | Photo List | Links to 3.1.1 Mobile-Photo List | Menu | SCREEN | 1 |
| | Home | Links to 2.0 J2ME Client Home | Menu | SCREEN | 2 |
| | Back | Previous screen | Back button | BACK | 1 |
| Up Arrow | When (3) or (4) is selected, jumps up to (1) or (2). When (1) or (2), moves up one row. | | | | |
| Down Arrow | When (1) or (2) is selected, jumps down to (3) or (4). When (3) or (4), moves down one row. | | | | |
| Left Arrow | Cycle through all thumbs on the screen, (4)-(1) then to the row above. Rows are added one at a time, so the top row shifts down when a new row is loaded. | | | | |
| Right Arrow | Cycle through all thumbs on the screen, (1)-(4) then to the row below. Rows are added one at a time, so the bottom row shifts up when a new row is loaded. | | | | |

-continued

3.1.2 Mobile Photo Thumbs

| | |
|---|---|
| Comments | List loops back to beginning when user reaches last image. When looping to the beginning, the full screen refreshes all 4 images. When an image is deleted all other images move to fill the empty space Each photo is surrounded by 2 pixels of white space. The selected photo has a 2 pixel border. |

3.1.3 Mobile Photo

| | | | | | |
|---|---|---|---|---|---|
| Default Selection | — | | | | |
| | Label | Function | Pref. Location | Type | Priority |
| Actions | Done | Album. Links to most recent view of album - 3.1.1 or 3.1.2 - with most recently viewed image selected. | Primary Soft key, OK Button | ITEM | 1 |
| | Slideshow | Links to 3.3 Mobile Slideshow, starting show with current photo | Menu | ITEM | 2 |
| | Move | Links to 3.2.1 Move | Menu | ITEM | 4 |
| | Delete | Links to 3.2.4 Delete | Menu | ITEM | 4 |
| | Home | Links to 2.0 J2ME Client Home | Menu | SCREEN | 2 |
| | Back | Previous screen | Back | BACK | 1 |
| Up Arrow | — | | | | |
| Down Arrow | — | | | | |
| Left Arrow | Jumps to previous image in gallery. When first image is reached, loops to end. | | | | |
| Right Arrow | Jumps to next image in gallery. When last image is reached, loops to beginning. | | | | |
| Comments | Image should be as large as possible on any particular screen. | | | | |

3.1.4 Mobile Album Empty

| | | | | | |
|---|---|---|---|---|---|
| Default Selection | My Online Albums | | | | |
| | Label | Function | Pref. Location | Type | Priority |
| Actions | OK | | Primary Soft key, OK Button | ITEM | 1 |
| | Back | Previous screen | Back | BACK | 1 |
| Up Arrow | — | | | | |
| Down Arrow | — | | | | |
| Left Arrow | — | | | | |
| Right Arrow | — | | | | |
| Comments | | | | | |

3.1.4.2 Mobile- Restore Album Info

| | | | | | |
|---|---|---|---|---|---|
| Default Selection | My Online Albums | | | | |
| | Label | Function | Pref. Location | Type | Priority |
| Actions | OK | Links to 3.1.4.2.1 Restore Mobile Album | Primary Soft key, OK Button | ITEM | 1 |
| | Back | Previous screen | Back | BACK | 1 |
| Up Arrow | — | | | | |
| Down Arrow | — | | | | |
| Left Arrow | — | | | | |
| Right Arrow | — | | | | |
| Comments | | | | | |

3.1.4.1 Mobile- About

| | | | | | |
|---|---|---|---|---|---|
| Default Selection | My Online Albums | | | | |
| | Label | Function | Pref. Location | Type | Priority |
| Actions | OK | Links to 2.1 My Online Albums | Primary Soft key, OK Button | ITEM | 1 |
| | Back | Previous screen | Back | BACK | 1 |
| Up Arrow | — | | | | |
| Down Arrow | — | | | | |
| Left Arrow | — | | | | |
| Right Arrow | — | | | | |
| Comments | | | | | |

3.1.4.2.1 Restore Mobile Album

| | | | | | |
|---|---|---|---|---|---|
| Default Selection | | | | | |
| | Label | Function | Pref. Location | Type | Priority |
| Actions | Pick | Toggles state of checkbox | Primary Soft key, OK Button | ITEM | 1 |
| | Save | Downloads all selected images to Mobile Album | Secondary Soft key | SCREEN | 1 |
| | Back | Previous screen | Back | BACK | 1 |

3.1.4.2.1 Restore Mobile Album

| | |
|---|---|
| Up Arrow | Jumps to previous item in list. If top item is selected, does nothing. |
| Down Arrow | Jumps to next item in list. If last item is selected, does nothing. |
| Left Arrow | May toggle state of checkbox. |
| Right Arrow | May toggle state of checkbox. |
| Comments | This screen lists a close approximation of the items downloaded to a particular phone using a particular account. When the user has selected the photos he wishes to restore and presses "Save" all the images are downloaded to the mobile album. If the Mobile Album already has photos in it, restored photos are added at the bottom of the list. |

3.2.1 Move

| | |
|---|---|
| | When (3) is selected, swaps with (2). |
| | When (4) is selected, swaps with (3). |
| | When first image is selected, jumps to last image. |
| Right Arrow | When (4) is selected, jumps to previous screen and swaps with (1) on that screen. |
| | When (3) is selected, swaps with (2). |
| | When (2) is selected, swaps with (3). |
| | When (3) is selected, swaps with (4). |
| | When final image is selected, jumps to first image. |
| Comments | Small arrow images overlaid on the image being moved. |

3.2.4 Delete

Default Selection: —

| | Label | Function | Pref. Location | Type | Priority |
|---|---|---|---|---|---|
| Actions | Delete | Deletes photo and returns user to 3.1.1 or 3.1.2 (last used) with image in position of deleted image selected. | Primary Soft key | OK | 1 |
| | Cancel | Cancels deletion and links to previous screen | Secondary Soft key | BACK | 2 |
| | Back | Cancels deletion and | Back | BACK | 1 |
| Up Arrow | — | | | | |
| Down Arrow | — | | | | |
| Left Arrow | — | | | | |
| Right Arrow | — | | | | |
| Comments | | | | | |

3.2.1 Move

Default Selection: Selected Photo

| | Label | Function | Pref. Location | Type | Priority |
|---|---|---|---|---|---|
| Actions | Done | Drops photo in current location. Links to 3.2.1 with moved photo selected. | Primary Soft key, OK Button | OK | 1 |
| | Back | Links to previous page (before move command was selected) and cancels | Back button | BACK | 1 |
| Up Arrow | When (3) or (4) is selected, swaps with (1) or (2). When (1) or (2) is selected, moves up one row. | | | | |
| Down Arrow | When (1) or (2) is selected, swaps with (3) or (4). When (3) or (4) is selected, moves down one row. | | | | |
| Left Arrow | When (1) is selected, jumps to previous screen and swaps with (4) on that screen. When (2) is selected, swaps with (1). | | | | |

3.2.4 Delete All

Default Selection: —

| | Label | Function | Pref. Location | Type | Priority |
|---|---|---|---|---|---|
| Actions | Delete | Deletes all photos and returns user to 3.1.4 Mobile Album Empty. | Primary Soft key | OK | 1 |
| | Cancel | Cancels deletion and links to previous screen | Secondary Soft key | BACK | 2 |
| | Back | Cancels deletion and | Back | BACK | 1 |
| Up Arrow | — | | | | |
| Down Arrow | — | | | | |
| Left Arrow | — | | | | |
| Right Arrow | — | | | | |
| Comments | | | | | |

| 3.3 Mobile Slideshow | | | | | |
|---|---|---|---|---|---|
| Default Selection | — | | | | |
| | Label | Function | Pref. Location | Type | Priority |
| Actions | Stop | Ends slideshow and returns user to 3.1.1 or 3.1.2 (last used). | Primary Soft key | OK | 1 |
| | Pause | Pauses slideshow and switches first Action to "Play." Pressing again re-starts slideshow from the current image. | Menu | SCREEN | 1 |
| | Slow | Switches speed to Slow. | Menu | SCREEN | 2 |
| | Normal | Switches speed to Normal. | Menu | SCREEN | 3 |
| Up Arrow | — | | | | |
| Down Arrow | — | | | | |
| Left Arrow | Jumps to previous image. Slideshow continues to play at same speed. | | | | |
| Right Arrow | Jumps to next image. Slideshow continues to play at same speed. | | | | |
| Comments | Image should be as large as possible on any particular screen. If possible, backlight should remain on until slideshow is stopped. Screen should not refresh while Actions menu is open. The screen has no header. | | | | |

Although the present invention has been described in accordance with the embodiments shown, variations to the embodiments would be apparent to those skilled in the art and those variations would be within the scope and spirit of the present invention. Accordingly, it is in tended that the specification and embodiments shown be considered exemplary only, with a true scope of the invention being indicated by the following claims and equivalents.

What is claimed is:

1. A method comprising:
receiving, at a network hosting a server and from a sender's mobile device via the sender's wireless network that is different than the hosting network, the sender's upload message comprising images destined for upload to an account associated with a receiving user on the server;
screening, at the hosting network, the sender's upload message to determine, using a network address of a gateway in the sender's wireless network, whether or not to block the sender's upload message before the sender's upload message reaches the server;
where the upload message is not blocked by the network's screening, the server further screening the sender's upload message based on opt-in parameters predetermined by the receiving user for the account that the sender's upload message is destined, the further screening comprising:
accessing the receiving user's predetermined opt-in parameters, the opt-in parameters comprising an identity of each mobile device of a plurality of mobile devices authorized by the receiving user to upload image data to the account and a receiving user-authorized limit number of image uploads for receipt by the receiving user during a given period of time;
obtaining the identity of the sender's mobile device;
determining whether or not to allow upload of the images associated with the sender's upload message to the account using the receiving user's predetermined opt-in parameters, a number of upload images received by the receiving user's account during the given period and the identity of the sender's mobile device; and
enabling manual upload of the images by the receiving user to the account via a redirection of the sender's upload message to the receiving user's email address if the images in the sender's upload message are not allowed to be uploaded into the receiving user's account.

2. The method of claim 1, wherein the network address of the gateway and the identity of the mobile device are included in the upload message, the method further comprising:
parsing the upload message to obtain the network address of the gateway and the identity of the mobile device.

3. The method of claim 1, wherein the mobile device is a wireless phone and the identity of the mobile device is a phone number assigned to it by the bearer of the wireless network.

4. The method as in claim 1, wherein the gateway is a messaging gateway.

5. The method of claim 1, further comprising:
if the sender's mobile device is not identified in the opt-in parameters, prompting the receiving user to indicate whether the receiving user wants to add the sender's mobile device identity to the opt-in parameters.

6. A computer readable non-transitory medium embodying a computer program comprising:
program code to receive, at a network hosting a server and from a sender's mobile device via the sender's wireless network that is different than the hosting network, the sender's upload message comprising images being destined for upload to an account associated with a receiving user on the server;
program code to screen, at the hosting network, the sender's upload message to determine, using a network address of a gateway in the sender's wireless network, whether or not to block the sender's upload message before the sender's upload message reaches the server;
where the upload message is not blocked by the network's screening, program code to further screen, at the server, the sender's upload message based on opt-in parameters predetermined by a receiving user for the account that the sender's upload message is destined, the program code to further screen comprising:

program code to access the receiving user's predetermined opt-in parameters, the opt-in parameters comprising an identity of each mobile device of a plurality of mobile devices authorized by the receiving user to upload image data to the account and a receiving user-authorized limit number of image uploads for receipt by the receiving user's account during a given period of time;

program code to obtain the identity of the sender's mobile device;

program code to determine whether or not to allow upload of the images associated with the sender's upload message to the account using the receiving user's predetermined opt-in parameters, a number of upload images received by the receiving user's account during the given period and the identity of the sender's mobile device;

program code for redirecting of the sender's upload message to the receiving user's email address if the images in the sender's upload message are not allowed to be uploaded into the receiving user's account; and program code for manual upload of the images by the receiving user via the redirection.

7. The computer readable non-transitory medium of claim 6, wherein the network address of the gateway and the identity of the mobile device are included in the upload message, the program code further comprising:

program code to parse the upload message to obtain the network address of the gateway and the identity of the mobile device.

8. The computer readable non-transitory medium of claim 6, wherein the mobile device is a wireless phone and the identity of the mobile device is a phone number assigned to it by the bearer of the wireless network.

9. The computer readable non-transitory medium of claim 6, wherein the gateway is a messaging gateway.

10. The computer readable non-transitory medium of claim 6, the program code further comprising:

program code to, if the sender's mobile device is not identified in the opt-in parameters, prompt the receiving user to indicate whether the receiving user wants to add the sender's mobile device identity to the opt-in parameters.

11. A system comprising:

a server with a processor and a memory embodying a server-side program as a portion of a computer application;

a network hosting the server;

wherein the hosting network includes a networking service with a processor for executing and a memory for storing a network security program portion of a computer application with program code for causing the hosting network's network service processor to security screen a sender's upload message comprising images using a network address of the sender's gateway to determine whether or not to block the sender's upload message before the sender's upload message reaches the server;

where the upload message is not blocked by the hosting network's screening, the server-side program further screening the sender's upload message based on opt-in parameters predetermined by a receiving user for an account that the sender's upload message is destined, the server-side program including program code for the further screening that causes the processor in the server to:

access the receiving user's predetermined opt-in parameters, the opt-in parameters comprising an identity of each mobile device of a plurality of mobile devices authorized by the receiving user to upload image data to the account and a receiving user-authorized limit number of image uploads for receipt by the receiving user during a given period of time;

obtain an identity of the sender's mobile device;

determine whether or not to allow upload of the images associated with the sender's upload message to the account using the receiving user's predetermined opt-in parameters, a number of upload images received by the receiving user's account during the given period and the identity of the sender's mobile device;

enable manual upload of the images by the receiving user to the account via a redirection of the sender's upload message to the receiving user's email address if the images in the sender's upload message are not allowed to be uploaded into the receiving user's account.

12. The system of claim 11, wherein the network address of the gateway and the identity of the mobile device are included in the upload message, the computer application further comprising:

program code in the networking service program for causing the network security processor to parse the upload message to obtain the network address of the gateway; and program code in the server-side program for causing the server to parse the upload message to identity of the mobile device.

13. The system of claim 11, wherein the mobile device is a wireless phone and the identity of the mobile device is a phone number assigned to the wireless phone.

14. The system of claim 11, wherein the gateway is a messaging gateway.

15. A method comprising:

receiving, at a network hosting a server and from a sender's mobile device via the sender's wireless network that is different than the hosting network, the sender's upload message comprising images being destined for upload to an account associated with a receiving user on the server;

screening, at the hosting network, the sender's upload message to determine, using a network address of a gateway in the sender's wireless network, whether or not to block the sender's upload message before the sender's upload message reaches the server;

where the upload message is not blocked by the screening performed by the hosting network, the hosting network:

forwarding the sender's upload message to the server for further screening of the sender's upload message based on opt-in parameters predetermined by the receiving user for the account that the sender's upload message is destined, a number of image uploads received by the receiving user during the given period and an identity of the sender's mobile device, the opt-in parameters comprising the identity of each mobile device of a plurality of mobile devices authorized by the receiving user to upload image data to the account and a receiving user-authorized limit number of image uploads for receipt by the receiving user during a given period of time; and enabling manual upload of the images by the receiving user to the account via a redirection of the sender's upload message to the receiving user's email address if the images in the sender's upload message are not allowed to be uploaded into the receiving user's account.

16. A computer readable non-transitory medium embodying a computer program comprising:

program code to receive, at a network hosting a server and from a sender's mobile device via the sender's wireless network that is different than the hosting network, the sender's upload message being destined for an account associated with a receiving user on the server;

program code to screen, at the hosting network, the sender's upload message to determine, using a network address of a gateway in the sender's wireless network, whether or not to block the sender's upload message before the sender's upload message reaches the server;

program code to forward, by the hosting network, the sender's upload message to the server for further screening when the upload message is not blocked by the screening performed by the hosting network;

program code for further screening the sender's upload message based on opt-in parameters predetermined by the receiving user for the account that the sender's upload message is destined, a number of image uploads received by the receiving user during the given period, and an identity of the sender's mobile device, the opt-in parameters comprising the identity of each mobile device of a plurality of mobile devices authorized by the receiving user to upload image data to the account and a receiving user-authorized limit number of image uploads for receipt by the receiving user during a given period of time;

program code for redirecting of the sender's upload message to the receiving user's email address if the images in the sender's upload message are not allowed to be uploaded into the receiving user's account; and program code for manual upload of the images by the receiving user via the redirection.

* * * * *